(12) United States Patent
Bylicka et al.

(10) Patent No.: US 12,095,973 B2
(45) Date of Patent: Sep. 17, 2024

(54) METHOD AND SYSTEM OF IMAGE PROCESSING WITH MULTI-OBJECT MULTI-VIEW ASSOCIATION

(71) Applicant: Intel Corporation, Santa Clara, CA (US)

(72) Inventors: Bogna Bylicka, Gdansk (PL); Pawel Pieniazek, Gdansk (PL); Jakub Powierza, Starogard Gdanski (PL)

(73) Assignee: Intel Corporation, Santa Clara, CA (US)

( * ) Notice: Subject to any disclaimer, the term of this patent is extended or adjusted under 35 U.S.C. 154(b) by 692 days.

(21) Appl. No.: 17/131,433

(22) Filed: Dec. 22, 2020

(65) Prior Publication Data

US 2021/0112238 A1    Apr. 15, 2021

(51) Int. Cl.
*H04N 13/282* (2018.01)
*G06T 5/50* (2006.01)
*H04N 13/243* (2018.01)
*H04N 13/275* (2018.01)

(52) U.S. Cl.
CPC ............. *H04N 13/282* (2018.05); *G06T 5/50* (2013.01); *H04N 13/243* (2018.05); *H04N 13/275* (2018.05)

(58) Field of Classification Search
CPC ............................ H04N 13/243; H04N 13/275
See application file for complete search history.

(56) References Cited

U.S. PATENT DOCUMENTS

| 8,615,105 B1 | 12/2013 | Cheng et al. |
| 9,916,508 B2 | 3/2018 | Pillai et al. |
| 9,948,902 B1 | 4/2018 | Trundle |

(Continued)

FOREIGN PATENT DOCUMENTS

| CN | 108108674 A | 6/2018 |
| CN | 108629801 A | 10/2018 |

(Continued)

OTHER PUBLICATIONS

Dong, J. et al., "Fast and robust multi-person 3D pose estimation from multiple views", Proceedings of the IEEE Conference on Computer Vision and Pattern Recognition; pp. 7792-7801, 2019.

(Continued)

*Primary Examiner* — Jayanti K Patel
*Assistant Examiner* — Christopher Kingsbury Glover
(74) *Attorney, Agent, or Firm* — Hanley, Flight & Zimmerman, LLC

(57) ABSTRACT

Example image processing methods, apparatus, systems and articles of manufacture (e.g., computer readable media) to implement multi-object multi-view association are disclosed. Examples disclosed herein obtain initial two-dimensional (2D) bounding boxes of detected objects in multiple images of a scene from multiple cameras, generate a plurality of three-dimensional (3D) bounding boxes potentially corresponding to one or more objects to be tracked, and generate a weight that represents a strength of association between two detected objects respectively in two images of the multiple images. The weight is based on projection of one of the 3D bounding boxes back to at least one of the two images to generate a re-projection 2D bounding box.

22 Claims, 13 Drawing Sheets

(56) References Cited

U.S. PATENT DOCUMENTS

| | | | |
|---|---|---|---|
| 10,176,405 | B1 | 1/2019 | Zhou et al. |
| 10,304,191 | B1 | 5/2019 | Mousavian et al. |
| 10,332,264 | B2 | 6/2019 | Schulter et al. |
| 10,402,983 | B2 | 9/2019 | Schulter et al. |
| 10,430,966 | B2 | 10/2019 | Varadarajan et al. |
| 10,733,441 | B2 | 8/2020 | Mousavian et al. |
| 10,853,970 | B1 | 12/2020 | Akbas et al. |
| 2013/0322720 | A1 | 12/2013 | Hu et al. |
| 2015/0095360 | A1 | 4/2015 | Vrcelj et al. |
| 2016/0267331 | A1 | 9/2016 | Pillai et al. |
| 2018/0130215 | A1 | 5/2018 | Schulter et al. |
| 2018/0130216 | A1* | 5/2018 | Schulter .................. H04N 7/18 |
| 2018/0173969 | A1 | 6/2018 | Pillai et al. |
| 2018/0293445 | A1* | 10/2018 | Gao ...................... G05D 1/0248 |
| 2019/0026917 | A1 | 1/2019 | Liao et al. |
| 2019/0066326 | A1 | 2/2019 | Tran et al. |
| 2019/0171909 | A1 | 6/2019 | Mandal et al. |
| 2019/0220992 | A1 | 7/2019 | Li et al. |
| 2019/0278983 | A1 | 9/2019 | Iqbal et al. |
| 2019/0340432 | A1 | 11/2019 | Mousavian et al. |
| 2020/0074678 | A1 | 3/2020 | Ning et al. |
| 2020/0082180 | A1* | 3/2020 | Wang ...................... G06V 20/56 |
| 2020/0160102 | A1 | 5/2020 | Bruna et al. |
| 2020/0193628 | A1* | 6/2020 | Chakraborty ......... G06F 18/217 |
| 2020/0364454 | A1* | 11/2020 | Mousavian ............ G06V 20/58 |
| 2020/0401793 | A1 | 12/2020 | Leung et al. |
| 2021/0112238 | A1 | 4/2021 | Bylicka et al. |
| 2021/0117648 | A1 | 4/2021 | Yang et al. |
| 2021/0209797 | A1* | 7/2021 | Lee .......................... G06T 17/00 |
| 2021/0350555 | A1 | 11/2021 | Fischetti |
| 2021/0366146 | A1 | 11/2021 | Khamis et al. |
| 2022/0172429 | A1* | 6/2022 | Tong .......................... G06T 7/55 |
| 2022/0343639 | A1 | 10/2022 | Li et al. |
| 2022/0351535 | A1 | 11/2022 | Tao et al. |
| 2023/0186567 | A1 | 6/2023 | Koh |
| 2023/0298204 | A1 | 9/2023 | Wang |

FOREIGN PATENT DOCUMENTS

| | | |
|---|---|---|
| CN | 108960036 A | 12/2018 |
| CN | 108986197 A | 12/2018 |
| CN | 109886090 A | 6/2019 |
| CN | 109948587 A | 6/2019 |
| CN | 110008913 A | 7/2019 |
| CN | 110009722 A | 7/2019 |
| CN | 110047101 A | 7/2019 |
| CN | 110458940 A | 11/2019 |
| CN | 110516670 A | 11/2019 |
| KR | 20190087258 A | 7/2019 |
| WO | 2019025729 A1 | 2/2019 |
| WO | 2021109118 A1 | 6/2021 |
| WO | 2021120157 A1 | 6/2021 |
| WO | 2021258386 A1 | 12/2021 |

OTHER PUBLICATIONS

Zhong, Z. et al., "Camera Style Adaptation for Person Reidentification", CVPR (2018), pp. 5157-5166.
International Search Report and Written Opinion for PCT Patent Application No. PCT/US2021/050609, dated Dec. 28, 2021.
International Preliminary Report on Patentability from PCT/US2021/050609 notified Jul. 6, 2023, 7 pgs.
Zajdel et al., "Keeping Track of Humans: Have I Seen This Person Before?" ResearchGate, May 2005, 7 pages.
Felzenszwalb et al. "Object Detection with Discriminatively Trained Part Based Models," IEEE Trans on PAMI 2010, 20 pages.
Andriluka et al., "2D Human Pose Estimation: New Benchmark and State of the Art Analysis," Computer Vision Foundation, 2014, 8 pages.
Zhang et al., "Part-based R-CNNs for Fine-grained Category Detection," arXiv:1407.3867v1 [cs.CV], Jul. 15, 2014, 16 pages.
Zheng et al., "Scalable Person Re-identification: A Benchmark," Computer Vision Foundation, 2015, 9 pages.
Schroff et al., "FaceNet: A unified Embedding for Face Recognition and Clustering," arXiv:1503.03832v3 [cs.CV], Jun. 17, 2015, 10 pages.
Joo et al., "Panoptic Studio: A Massively Multiview System for Social Interaction Capture," Dec. 9, 2016, Retrieved from the Internet: <https://arxiv.org/abs/1612.03153> 14 pages.
Pavlakos et al., "Harvesting Multiple Views for Marker-less 3D Human Pose Annotations," Apr. 16, 2017, Retrieved from the Internet: <https://arxiv.org/abs/1704.04793> 10 pages.
Zhong et al., "Random Erasing Data Augmentation," arXiv:1708.04896v2 [cs.CV], Nov. 16, 2017, 10 pages.
Hermans et al., "In Defense of the Triplet Loss for Person Re-Identification," arXiv:1703.07737v4 [cs.CV], Nov. 21, 2017, 17 pages.
Hu et al., "Squeeze-and-Excitation Networks," Computer Vision Foundation, 2018, 10 pages.
Sun et al., "Beyond Part Models: Person Retrieval with Refined Part Pooling (and A Strong Convolutional Baseline)," arXiv:1711.09349v3 [cs.cv], Jan. 9, 2018, 10 pages.
Zhang et al., "AlignedReID: Surpassing Human-Level Performance in Person Re-Identification," arXiv.1711.08184v2 [cs.CV], Jan. 31, 2018, 10 pages.
Rhodin et al., "Learning Monocular 3D Human Pose Estimation from Multi-view Images," Mar. 24, 2018, Retrieved from the Internet: <https://arxiv.org/abs/1803.04775>, 10 pages.
Ionescu et al., "Human3.6M Dataset," Retrieved from the Internet: http://vision.imar.ro/human3.6m/description.php, 1 page.
Wang et al., "Learning Discriminative Features with Multiple Granularities for Person Re-Identification," arXiv:1804.01438v3 [cs.CV], Aug. 17, 2018, 9 pages.
Wojke et al., "Deep Cosine Metric Learning for Person Re-Identification," arXiv:1812.00442v1 [cs.CV], Dec. 2, 2018, 9 pages.
Wang et al., "Person Re-identification with Cascaded Pairwise Convolutions," 2018 IEEE/CVF Conference on Computer Vision and Pattern Recognition, Dec. 31, 2018 (9 pages).
Intel, "2019 CES: Intel and Alibaba Team on New AI-Powered 3D Athlete Tracking Technology Aimed at the Olympic Games Tokyo 2020," Retrieved from the Internet: [https://newsroom.intel.com/news/intel-alibaba-team-ai-powered-3d-athlete-trackingtechnology-olympic-games-tokyo-2020/#gs-xy8m7c], Jan. 7, 2019, 3 pages.
Schwarcz et al., "3D Human Pose Estimation from Deep Multi-View 2D Pose," Feb. 7, 2019, Retrieved from The Internet: <https://arXiv:1902.02841v1> 6 pages.
Sun et al., "Deep High-Resolution Representation Learning for Human Pose Estimation," arXiv:1902.09212v1 [cs.CV], Feb. 25, 2019, 12 pages.
Luo et al., "Bag of Tricks and A Strong Baseline for Deep Person Re-identification," arXiv:1903.07071v3 [cs.CV], Apr. 19, 2019, 9 pages.
Iskakov et al., "Learnable Triangulation of Human Pose," May 14, 2019, Retrieved from the Internet: <https://arXiv:1905.05754v1> 9 pages.
Min Xin et al., "Motion Capture Research: 3D Human Pose Recovery Based on RGB Video Sequences," Applied Sciences, vol. 9, No. 17, Sep. 2, 2019, pp. 1-22, XP55885594, DOI: 10.3390/app9173613.
Qiu et al., "Cross View Fusion for 3D Human Pose Estimation," Sep. 3, 2019, Retrieved from the Internet: <https://arxiv.org/abs/1909.01203> 10 pages.
International Searching Authority, "Written Opinion of the International Searching Authority," issued in connection with International Patent Application No. PCT/CN2019/123625, mailed on Sep. 9, 2020, 4 pages.
International Searching Authority, "International Search Report," issued in connection with International Patent Application No. PCT/CN2019/123625, mailed on Sep. 9, 2020, 3 pages.
International Searching Authority, "Written Opinion of the International Searching Authority," issued in connection with International Patent Application No. PCT/CN2019/126906, mailed on Sep. 23, 2020, 3 pages.
International Searching Authority, "International Search Report," issued in connection with International Patent Application No. PCT/CN2019/126906, mailed on Sep. 23, 2020, 3 pages.

(56) References Cited

OTHER PUBLICATIONS

International Searching Authority, "Written Opinion of the International Searching Authority," issued in connection with International Patent Application No. PCT/CN2020/098306, mailed on Mar. 25, 2021, 4 pages.
International Searching Authority, "International Search Report," issued in connection with International Patent Application No. PCT/CN2020/098306, mailed on Mar. 25, 2021, 5 pages.
International Searching Authority, "International Preliminary Report on Patentability," issued in connection with International Patent Application No. PCT/CN2019/123625, mailed on Jun. 16, 2022, 6 pages.
International Searching Authority, "International Preliminary Report on Patentability," issued in connection with International Patent Application No. PCT/CN2019/126906, mailed on Jun. 30, 2022, 5 pages.
United States Patent and Trademark Office, " Non-Final Office Action," issued in connection with U.S. Appl. No. 16/914,232, mailed Jul. 21, 2022, 13 pages.
United States Patent and Trademark Office, " Notice of Allowance and Fee(s) Due," issued in connection with U.S. Appl. No. 16/914,232, mailed Nov. 30, 2022, 9 pages.
International Searching Authority, "International Preliminary Report on Patentability," issued in connection with International Patent Application No. PCT/CN2020/098306, mailed on Jan. 5, 2023, 6 pages.
Intel, "Intel True View," https://www.intel.com/content/www/us/en/sports/technology/true-view.html, last accessed Feb. 24, 2023.
European Patent Office, "Extended European Search Report," issued in connection with European patent Application No. 20941827.6, dated Feb. 29, 2024, 9 pages.
United States Patent and Trademark Office, " Notice of Allowance and Fee(s) Due," issued in connection with U.S. Appl. No. 16/914,232, dated Mar. 15, 2023, 8 pages.
Delannay et al., "Detection and Recognition of Sports(wo)men from Multiple Views," IEEE International Conference on Distributed Smart Cameras, Aug. 30-Sep. 2, 2009, 7 pages.
Arbues-Sanguesa et al., "Multi-Person tracking by multi-scale detection in Basketball scenarios," arXiv:1907.04637v1, Jul. 10, 2019, 8 pages.
Chen et al., "Spatial-Temporal Attention-Aware Learning for Video-Based Person Re-Identification," IEEE Transactions on Image Processing, vol. 28, Issue 9, Sep. 2019, 14 pages.
United States Patent and Trademark Office, "Non-Final Office Action," issued in connection with U.S. Appl. No. 17/764,100, dated Jun. 12, 2024, 10 pages.
United States Patent and Trademark Office, "Non-Final Office Action," issued in connection with U.S. Appl. No. 18/000,389, dated Jul. 1, 2024, 18 pages.
United States Patent and Trademark Office, "Final Office Action," issued in connection with U.S. Appl. No. 17/764,093, dated Jul. 15, 2024, 29 pages.
United States Patent and Trademark Office, "Non-Final Office Action," issued in connection with U.S. Appl. No. 17/764,093, dated Apr. 24, 2024, 28 pages.
Fu et al., "Delving deep into multiscale pedestrian detection via single scale feature maps." Sensors 18.4 (2018): 1063. https://www.mdpi.com/1424-8220/18/4/1063 (Year: 2018).

* cited by examiner

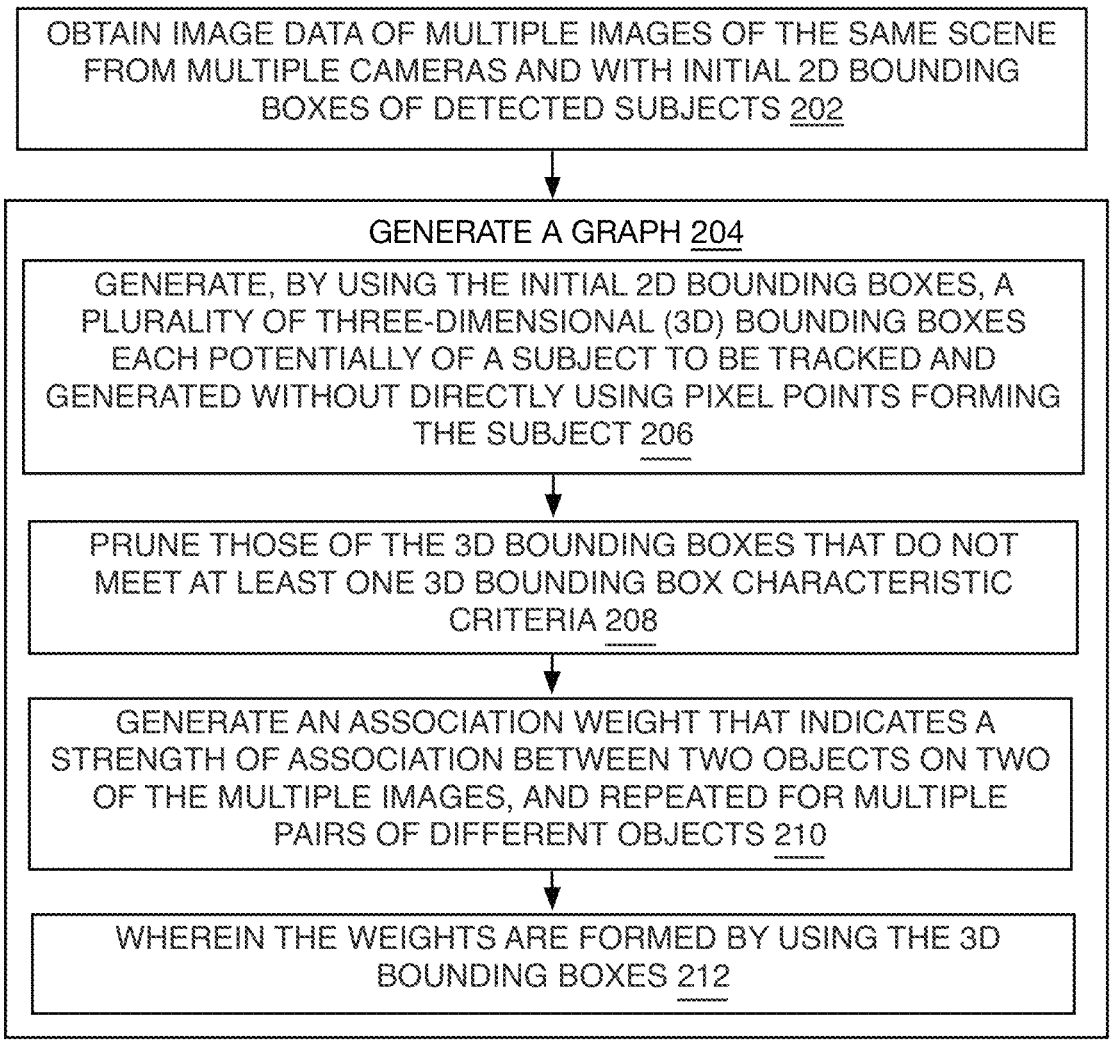

OBTAIN IMAGE DATA OF MULTIPLE IMAGES OF THE SAME SCENE FROM MULTIPLE CAMERAS 302

↓

GENERATE THREE-DIMENSIONAL BOUNDING BOXES OF POTENTIAL SUBJECTS TO BE TRACKED BY USING THE IMAGE DATA 304

↓

PRUNE THE BOUNDING BOXES THAT DO NOT MEET A BOUNDING BOX CHARACTERISTIC CRITERIA 306

↓

PROVIDE THE SUBJECT OF ONE OF THE THREE-DIMENSIONAL BOUNDING BOXES THE SAME IDENTIFIER IN THE MULTIPLE IMAGES 308

↓

USE THE IDENTIFIER TO OBTAIN TRACKING DATA OF THE SUBJECT OF ONE OF THE THREE-DIMENSIONAL BOUNDING BOXES WITH THE SAME IDENTIFIER IN THE MULTIPLE IMAGES 310

OBTAIN IMAGE DATA OF MULTIPLE IMAGES OF THE SAME SCENE FROM MULTIPLE CAMERAS 352

↓

GENERATE THREE-DIMENSIONAL BOUNDING BOXES OF POTENTIAL SUBJECTS TO BE TRACKED BY USING THE IMAGE DATA 354

↓

PROJECT THE 3D BOUNDING BOXES TO THE 2D IMAGES TO FORM A 2D RE-PROJECTED BOUNDING BOX ON THE INDIVIDUAL IMAGES 356

↓

DETERMINE AN ASSOCIATION WEIGHT INDICATING THE SIMILARITY BETWEEN OBJECTS ON DIFFERENT IMAGES 358

↓

USE THE ASSOCIATION WEIGHT TO DETERMINE WHICH 3D BOUNDING BOXES TO KEEP 360

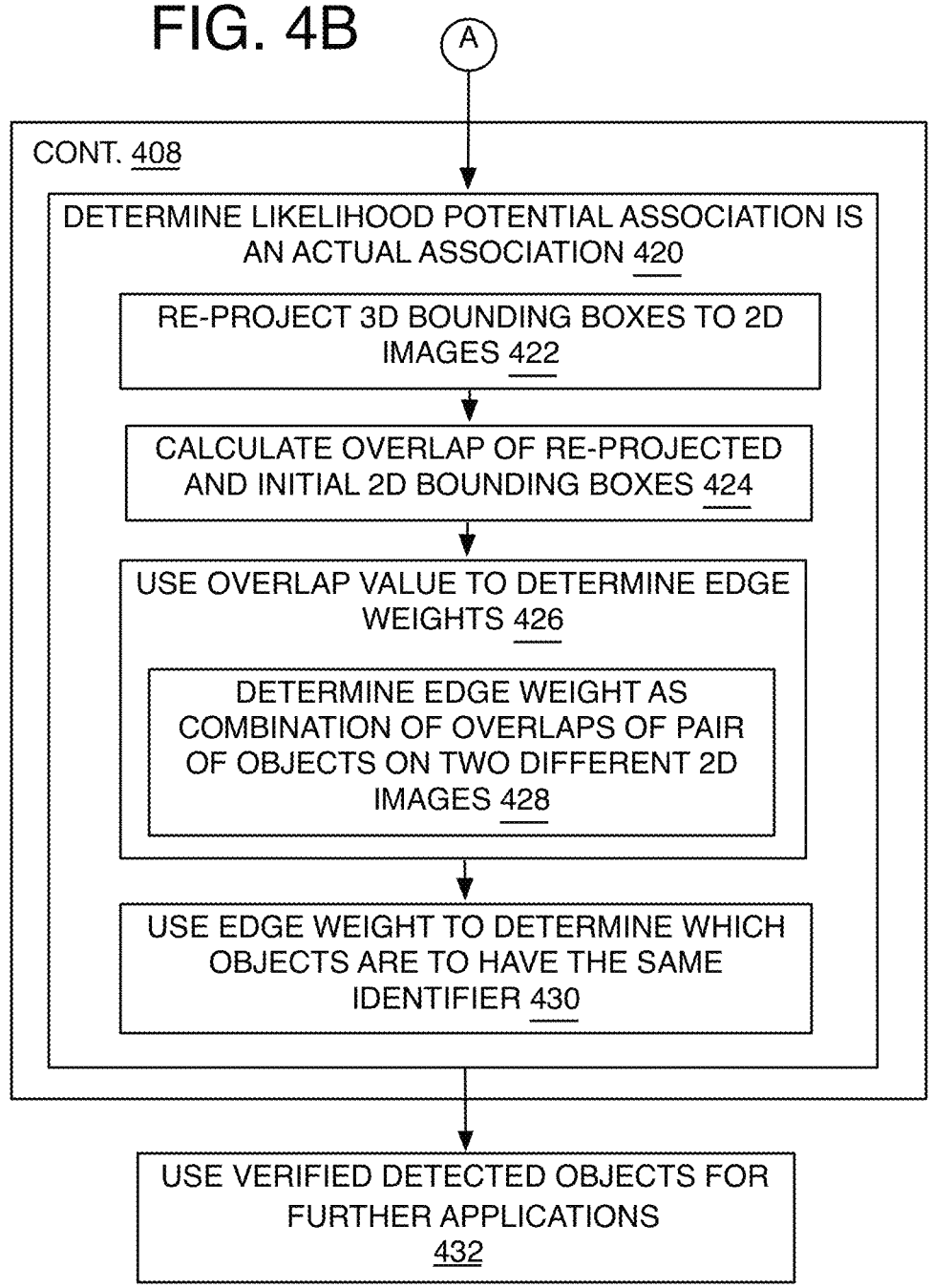

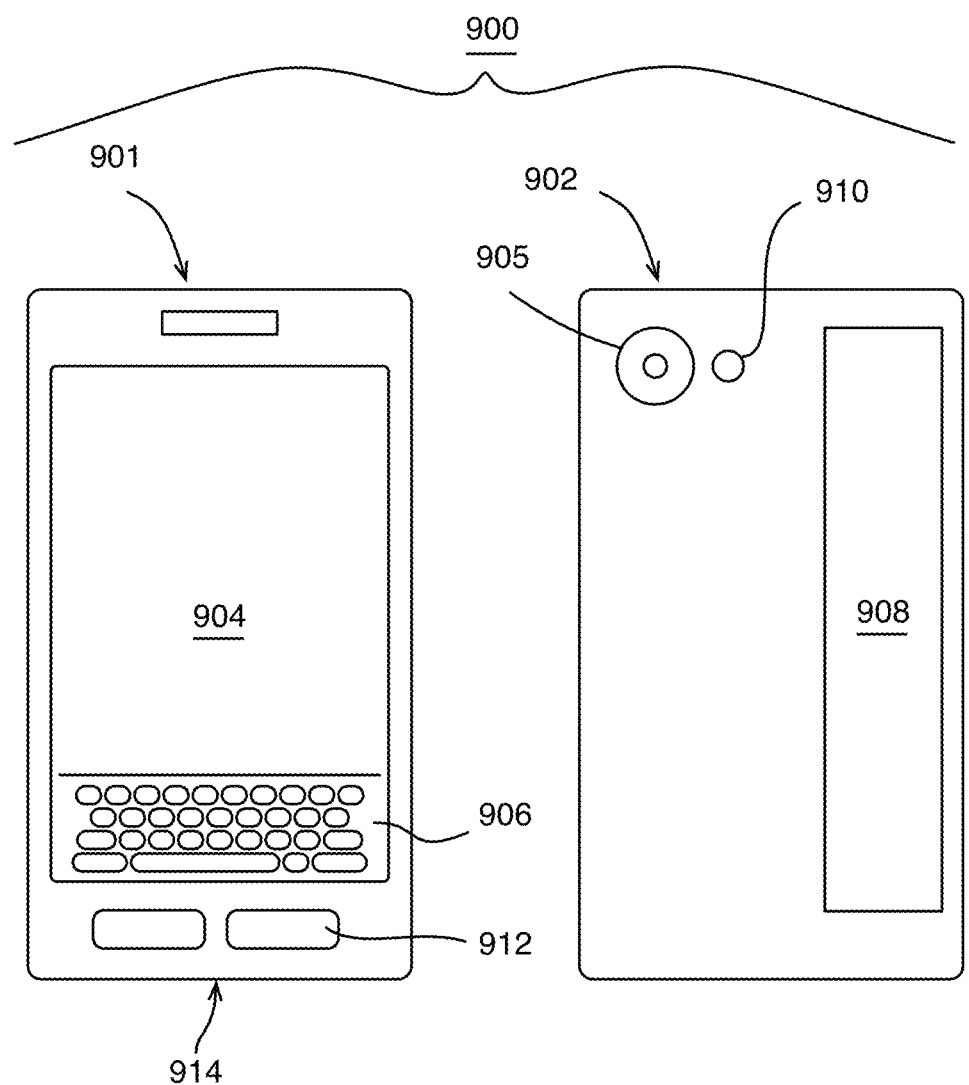

METHOD AND SYSTEM OF IMAGE PROCESSING WITH MULTI-OBJECT MULTI-VIEW ASSOCIATION

BACKGROUND

Camera arrays may be used to capture an event, people, or other objects from different perspectives for surveillance, biomechanical analysis (e.g., gait analysis), tracking multiple subjects, and/or computer-based applications, such as robotics, computer vision, and/or creation of intelligent interactive environments such as with virtual reality (VR) or augmented reality (AR). By one example, such tracking may be performed in order to monitor performance metrics such as the speed of certain motions of an athlete or to determine the exact body poses of an athlete. The image data of the captured images can be used to generate 3D models or constructions of the objects in order to track the objects over time and from frame to frame in video sequences provided by the cameras. When multiple objects (including subjects or people) are being tracked simultaneously by multiple cameras, it can be necessary to identify the subjects on the individual camera images. This is done in order to use the 2D data of those images to ultimately determine final 3D points on each of the subjects to measure or track the performance metrics of the subjects. The conventional techniques to perform the multi-camera or multi-view association (MVA) of a subject on multiple images from different cameras, so that each subject has the same identification on each camera view, typically causes delays due to the large computational loads and/or is inaccurate such that sufficiently accurate real-time tracking of multiple subjects cannot be achieved.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a flow chart of a method of image processing with multi-object multi-view association in accordance with at least one of the implementations disclosed herein;

FIG. 3A is another flow chart of a method of image processing with multi-object multi-view association in accordance with at least one of the implementations disclosed herein;

FIG. 3B is yet another flow chart of a method of image processing with multi-object multi-view association in accordance with at least one of the implementations disclosed herein;

FIGS. 4A-4B is a detailed flow chart of a method of image processing with multi-object multi-view association in accordance with at least one of the implementations disclosed herein;

FIG. 9 illustrates another example device, all arranged in accordance with at least some implementations of the present disclosure.

DETAILED DESCRIPTION

Figure 1:
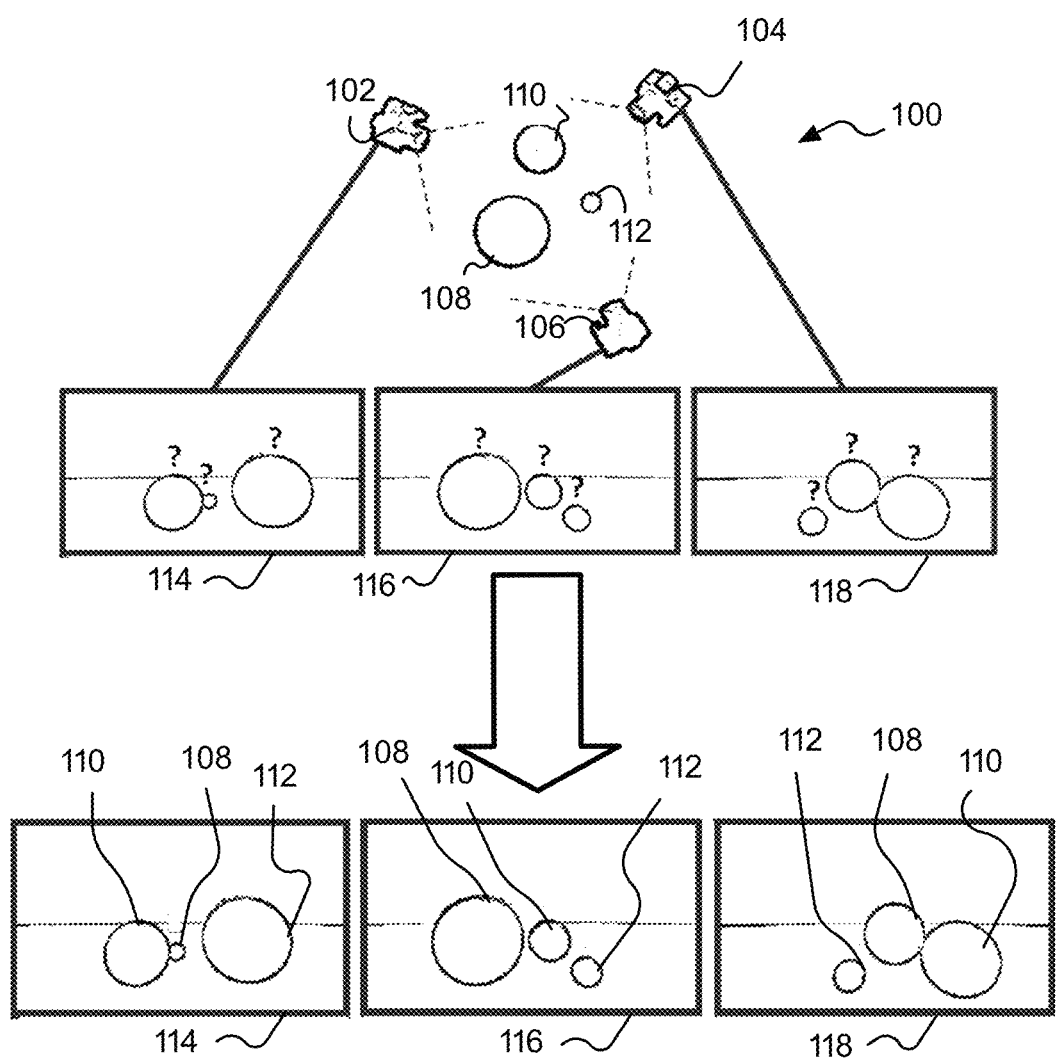
FIG. 1 is a schematic diagram to explain multi-object multi-view association in accordance with at least one of the implementations disclosed herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or commercial devices such as digital camera arrays, television camera arrays, networked cameras, robots, computer vision systems, computers, servers, and so forth, and/or consumer electronic (CE) devices such as imaging devices, digital cameras, smart phones, webcams, video game panels or consoles, set top boxes, tablets with single or multiple cameras, wearables such as HMDs, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of image processing with multi-object multi-view association.

Referring to FIG. 1, multi-object multi-view association (or multi-object MVA or MMVA herein) is an object recognition technique that uniquely identifies a set of objects from a given 3D scene captured by multiple cameras from different points of view, and results in each object of interest being assigned a unique identity that remains the same across all views. For example, a setting 100 may have three cameras 102, 104, and 106 to capture images of three balls 108, 110, and 112, but from a different perspective from each camera. Camera 102 generates image 114, camera 106 generates image 116, and camera 104 generates image 118. Although the position of each ball 108, 110, 112 in each of the images is different, it is difficult to determine the identity of each ball since they look alike. MVA processing labels the same ball with the same label in each of the images 114, 116, and 118. Thus, for example, the MVA process labels ball 108 ball 1 in each of the three images 114, 116, and 118, and this is repeated for ball 110 and ball 112.

Such MVA tracking is often used for many image processing applications such as crowd surveillance, sports analytics (or athlete tracking), 3D scene reconstruction and perception, "digital twins", and so forth. While some of these tracking systems create a 3D model or 3D reconstruction of subjects directly from the camera images without requiring labels on the 2D data of the cameras, other object tracking techniques still use 2D data to generate 3D key points or refine 3D key points on the tracked subjects to obtain sufficient precision to perform measurement of performance or attribute metrics for example. In these cases, the subjects on the 2D images often require the consistent labeling of the same object in multiple images from multiple cameras.

To accomplish the MMVA, one conventional technique is to use homography transformation from a camera plane to a scene plane. However, homography transformation assumes that the object of interest is placed on the same plane, e. g., ground level of a scene. This limit immediately disqualifies homography-type approaches for many applications including sports analytics. Also, homography usually results in errors with any situation that has partial occlusions. The errors from partial occlusions can be reduced by using multiple cameras from different angles and determining intersections of the resulting projection lines. However, this occlusion solution still results in large errors when one object is occluded by another object when the two objects are very similar and may have the same semantic type, as may occur when two players of an athletic team wear the same jersey, or otherwise in crowd surveillance.

Another known technique to perform MMVA is detection of feature points of the objects and triangulation of those points to recreate the original object in 3D space. Detection of the feature points may involve inputting each image into a neural network, and then triangulation of all of the detected features points from the different images, which may reach thousands of points for a single object. Thus, feature point MMVA techniques are computationally demanding, especially for multi-object use-cases, and hence are not applicable for real-time multi-object multi-view association. Moreover, the feature point MMVA techniques typically are susceptible to significant errors due to the variances in feature point detection algorithms as well as variances in camera calibration that sets the distance and angles between multiple cameras for example. This makes this technique too inaccurate for real time real-world use-cases. Additionally, feature point MMVA suffers from the same problem of occlusion as the homography methods since it is based on the intersection of lines.

Also, a conventional epipolar constraint MMVA technique determines whether two points from two different views are the same object based on a distance between (1) a joint of intersecting lines from two different camera perspectives and (2) a projection of the joint to a line on one view that also intersects the epipolar line between cameras. The epipolar line constraint, however, has similar disadvantages as that described above for feature point and homography techniques. For example, epipolar constraint has a very large computational load because it first requires neural network key point detection, and then calculation of the epipolar constraint for all key points. Moreover, since epipolar constraint techniques are based on points, this technique is susceptible to point detection and camera calibration errors as mentioned above.

Yet another known technique is referred to as re-identification (reID) of objects on each 2D view from each camera that identifies the same person in multiple views regardless of the style, settings, or other differences from camera to camera. This is performed with the help of a machine learning model, e.g., neural network, trained to extract characteristic features of the objects, or people on the image. See Zhong, Z. et al., "Camera Style Adaptation for Person Re-identification", CVPR (2018). ReID is a fine detail tool that is used in a multimodal approach combined with the methods mentioned above, for example, ReID plus epipolar constraint. See Dong, J. et al., "Fast and Robust Multi-Person 3D Pose Estimation from Multiple Views", Computer Science, CVPR (2019). These ReID methods, however, still fail with scenes with numerous objects of similar appearance that occur in many common scenarios of interest such as sports where athletes wear the same team jersey as mentioned above. Thus, these solutions either cannot be performed in real-time due to the computational load or are too inaccurate and error prone, or both, due to the processing of multi-object scenes with occlusions.

To resolve these issues, a spatially-assisted method and system of real-time multi-object multi-view association (MMVA) is disclosed. The method uses a multi-view association graph formulation to perform association between bounding boxes, and in turn objects on different 2D views, while focusing on significantly improving the procedure of mapping the scene of interest to the graph. Particularly, the present method harvests the insightful or relevant information of an object in the form of 3D bounding boxes rather than using a large number of feature or key points of an object, and then matches the 3D bounding boxes to objects on the 2D images of the multiple views to perform the association. Additionally a graph pruning method is proposed that further reduces the number of 3D bounding boxes on the graph to be taken into account, hence improving the computational efficiency. The pruning may be based on pre-set domains where a fixed camera array captures a known environment such as at an athletic stadium, arena, or theater. The pruning also may limit bounding box attributes when an approximate object size is known for example.

These techniques significantly eliminate many points for matching objects and drastically reduces computational load or cost in the matching operation by eliminating the feature point detection for the association and MMVA operation itself, and eliminates the need to calculate constraints for each point. Such a reduction of analysis data by merely tracking the bounding boxes rather than tracking individual points accelerates the process and positively impacts quality of the associations even in cases of high occlusion, and even though feature points still may be used to determine initial 2D object detection bounding boxes on the 2D images.

Specifically, the 3D bounding boxes are formed from projection of 2D bounding boxes from 2D images and into a 3D space or graph to form at least two hyper-planes as sides of the 3D bounding box, and this may be repeated for each pair of objects on different 2D image views. Since the present system and method operates in a 2D and 3D bounding box realm rather than a fine-grid realm based on points, the presently disclosed MMVA solution is more robust to errors originating from both inaccurate detection, erroneous camera calibration or frames synchronization error. Hence, relatively small errors with respect to the sizes of the objects within the bounding boxes do not significantly affect the MMVA results, if at all. Also, the creation of a 3D bounding box from two hyper-planes helps to avoid problems with occlusion by other objects since the intersection of lines to form the planes requires a minimal amount of lines that need to pass by the occluding object, thereby increasing the accuracy of the MMVA method.

Another aspect of the present system is to form the multi-view association graph by using 2D bounding boxes as nodes of the graph and edges of the graph that connect the nodes or 2D bounding boxes. The method generates association weights, also referred to as edge weights, that indicate the probability of association between two or more of the 2D bounding boxes used to form the 3D bounding boxes and represented as edges, or in other words, the probability that two 2D bounding boxes indicate the same subject. An edge is a connection (or line when represented in a schematic diagram such as FIG. 6) between two 2D bounding boxes (or graph nodes) on two different images, and the edge weight may be a weight for each edge connecting every possible or relevant 2D bounding box pair from different 2D images.

By one form, the edge weights are determined by re-projecting the 3D bounding box back to each image to generate a re-projection 2D bounding box that is then compared to the initial 2D bounding box on an individual image. A function is used to determine a difference or overlap for that initial 2D bounding box and other 2D bounding boxes including the re-projection 2D bounding box that was used to form the 3D bounding box. By one form, the overlap is determined by using a function of intersection over the union (IoU) of the re-projection and initial 2D bounding boxes. The overlaps are then used to form the edge weights. Then, a clique-type technique may use the edge weights (or 2D bounding box pairs) to indicate the correct associations that indicate the same object on multiple images. By one form, the edge weight represents or is a combination, such as an average, of two overlaps of two objects on two different images. Thus, by one form, only those edges with an edge weight that meets a matching criteria or threshold, such as with a minimum value, are still included in the analysis as associated objects in different images and the rest are dropped. This has the effect of better ensuring the accuracy and quality of the MMVA operations.

It will be appreciated, then, that the present system and method requires minimal, simple input information including the 2D bounding boxes and camera calibration information. This simplicity makes the present system and method easily adapted or tailored for specific situations or environments. Also, the disclosed method works well with scenes that have objects with very similar appearance (for example in sports as mentioned above) since each person, for example, is identified as a separate 3D bounding box. Furthermore, the present method also provides an approximate volume and location of the object in 3D space that can be used by other applications.

Referring to FIG. 2, process 200 is a method of image processing with multi-object multi-view association. Process 200 may include one or more operations, functions or actions 202 to 212 numbered evenly. By way of non-limiting example, process 200 may be described herein with reference to example image processing system 700 of FIG. 7, and where relevant.

Process 200 may include "obtain image data of multiple images of the same scene from multiple cameras and with initial 2D bounding boxes of detected subjects" 202. Thus, a camera array may be placed around an event such as an athletic event at a stadium. The cameras may be networked, or images otherwise collected, so a set of images can be analyzed that are taken at the same or substantially same time, and of the same scene. Object detection algorithms then may be performed to establish initial 2D bounding boxes on each image that indicate a region-of-interest with a detected object, such as a person, whether the box is around just a face, an entire body, or some portion of the body. Camera calibration information that indicates the different position and orientation of the multiple cameras relative to each other also may be obtained at this point.

Process 200 may include "generate a graph" 204. The object association between 2D images may be performed by forming a multi-view association graph that has edges that potentially match (and extend between) 2D bounding boxes, and in turn objects, as the nodes of the graph and that form end points of the edges. It will be understood that the multi-view association graph may not actually be drawn, visible, or physically constructed, but the algorithms used herein may be considered to generate nodes and edges as mentioned so that the algorithms herein can be treated as if such a graph is being constructed.

To generate the graph, process 200 may include "generate, by using the initial 2D bounding boxes, a plurality of three-dimensional (3D) bounding boxes each potentially of a subject to be tracked and generated without directly using pixel points forming the subject" 206. In other words, the definition of the initial 2D bounding boxes are used to determine cross-image association rather than any of the other numerous feature pixel points that may have been used to generate the initial 2D bounding boxes in the first place, and are not a defining point on the 2D bounding box itself. The initial 2D bounding box definition data often may be provided as two diagonally opposite corner pixel point locations of the 2D bounding box when the shape of the 2D bounding box is known, such as rectangular, although other shapes could be used as well.

The 3D bounding boxes may be generated by projecting each pair of 2D bounding boxes from different images into a 3D space using camera positions and orientations relative to each other obtained from camera calibration data. The 3D bounding boxes may be at least partly formed of hyperplanes representing the 2D bounding boxes. Each 2D bounding box, considered initial 2D bounding boxes, forms a potential node of the graph, and each pair of the 2D bounding boxes on different 2D images forms a potential edge of the graph.

Process 200 may include "prune those of the 3D bounding boxes that do not meet at least one 3D bounding box characteristic criteria" 208. Specifically, once the 3D bounding boxes are formed, the system can eliminate a lot of the irrelevant 3D bounding boxes, although some irrelevant 3D bounding boxes will still remain. Pruning of a 3D bounding box, in turn, removes (or prunes) the edge of the two 2D bounding boxes used to form the 3D bounding box from the graph. The characteristics may refer to object attributes or a domain. An attribute may be a typical size of a person which would limit the acceptable range of sizes of a 3D bounding box or any other attribute that distinguishes desired objects from non-desired objects. A domain characteristic may limit the location of the 3D bounding box on a 3D space that represents a known environment such as an athletic field or running track for example. This may significantly reduce the number of 3D bounding boxes, and in turn computational load, to perform the association analysis as well as subsequent image processing that uses the association.

Process 200 may include "generate an association weight that indicates a strength of association between two objects on two of the multiple images, and repeated for multiple pairs of different objects" 210, and "wherein the weights are formed by using the 3D bounding boxes" 212. This involves projecting the 3D bounding boxes back to at least two, or some, or all of the 2D images of the same or substantially same time (or time stamp) being analyzed. Each projection forms a re-projection 2D bounding box on one of the 2D images. Then, an overlap is computed for each re-projection by comparing the re-projection 2D bounding box to the initial 2D bounding boxes on that image. By one form, this is performed by using a comparison function to form an overlap (or overlap value) that uses both the intersection and the union of the bounding boxes, and in one form, is a value of intersection over union.

Thereafter, an association or an edge weight of an edge on the graph can be determined for each pair of initial 2D bounding boxes, and in turn each pair of objects, on different images that have an overlap value produced with a re-projection from the same 3D bounding box. By one form, the edge weight is computed by combining two overlap values from the two objects being paired. In one example, the overlap values may be averaged, but other functions could be used as well.

The edge weight then may be compared to a threshold, weight by weight, and the edges with weights that do not meet a threshold are then dropped as being too weak an association. The remaining edges form a final graph are then used in a maximal clique type of algorithm, where the sum of the weights of the clique are compared to a threshold or to the sum of other cliques. When the weights do not meet a threshold, then the edges of the bounding boxes being analyzed are dropped. This process of analyzing edge weights individually and then as a clique may be repeated for each 3D bounding box.

Referring to FIG. 3A, a process 300 is a method of image processing with multi-object multi-view association. In the illustrated implementation, process 300 may include one or more operations, functions or actions 302 to 310 numbered evenly. By way of non-limiting example, process 300 may be described herein with reference to example image capture processing system 700 of FIG. 7, and where relevant. Process 300 discloses one possible example method of using the pruning without using the weights.

Thus, process 300 may include "obtain image data of multiple images of the same scene from multiple cameras" 302, and "generate three-dimensional bounding boxes of potential subjects to be tracked by using the image data" 304 as described with process 200.

Process 300 may include "prune the bounding boxes that do not meet a bounding box characteristic criteria" 306, and to ultimately prune edges off of a multi-view association graph as mentioned above with process 200. Also as mentioned, the pruning may include attribute pruning, domain pruning, or both. Other details are described below.

Process 300 next may include "provide the subject of one of the three-dimensional bounding boxes the same identifier in the multiple images" 308. Thus, the 2D bounding box on those images used to form a 3D bounding box in the first place are then labeled (or associated with) the same object or person. This may include re-projecting of the 3D bounding boxes to the 2D images, generating overlap values, and combining the overlap values to generate edge weights as described herein. Other methods to determine which objects are associated could be used here instead including the use of feature points for example.

Process 300 may include "use the identifier to obtain tracking data of the subject of one of the three-dimensional bounding boxes with the same identifier in the multiple images" 310. Thereafter, the identifier may be used on the multiple images to perform subsequent processing. By one example, the 2D images may be used to track the motion of the objects or subjects such as body parts of an athlete. The tracked motion then can be used to compute performance metrics for example such as speed or stride for a runner for example, or precise body positioning for a team event or individual sport athlete such as a figure skater. Other tracking and non-tracking tasks may be performed as well whether for AI, entertainment, sports, and so forth.

Referring to FIG. 3B, a process 350 is a method of image processing with multi-object multi-view association. In the illustrated implementation, process 350 may include one or more operations, functions or actions 352 to 360 numbered evenly. By way of non-limiting example, process 300 may be described herein with reference to example image capture processing system 700 of FIG. 7, and where relevant. Process 350 discloses one possible example method of using the weights without pruning.

Process 350 may include "obtain image data of multiple images of the same scene from multiple cameras" 352, and "generate three-dimensional bounding boxes of potential subjects to be tracked by using the image data" 354 as described above with process 200.

Process 350 may include "project the 3D bounding boxes to the 2D images to form a 2D re-projected bounding box on the individual images" 356. Also as mentioned, re-projection 2D bounding boxes may be formed on each of the images being used for the analysis by projecting the 3D bounding boxes back to the 2D images.

Process 350 may include "determine an association weight indicating the similarity between objects on different images" 358, where first overlap values may be computed as a difference or representation of the difference between the initial 2D bounding box and the re-projection 2D bounding box, and by one example, the intersection of the two 2D bounding boxes over the union 2D bounding box. Each overlap is then combined or paired with an overlap of another object, or 2D bounding box, generated by re-projection of the same 3D bounding box. The combined overlap, such as an average, forms the edge weight for each edge or pair of objects.

Process 350 may include "use the association weight to determine which 3D bounding boxes to keep" 360. As mentioned, this may involve comparing each weight to a threshold and then a sum of weights in a clique to another threshold. The associations are then used by subsequent applications as mentioned above.

Figure 4A:
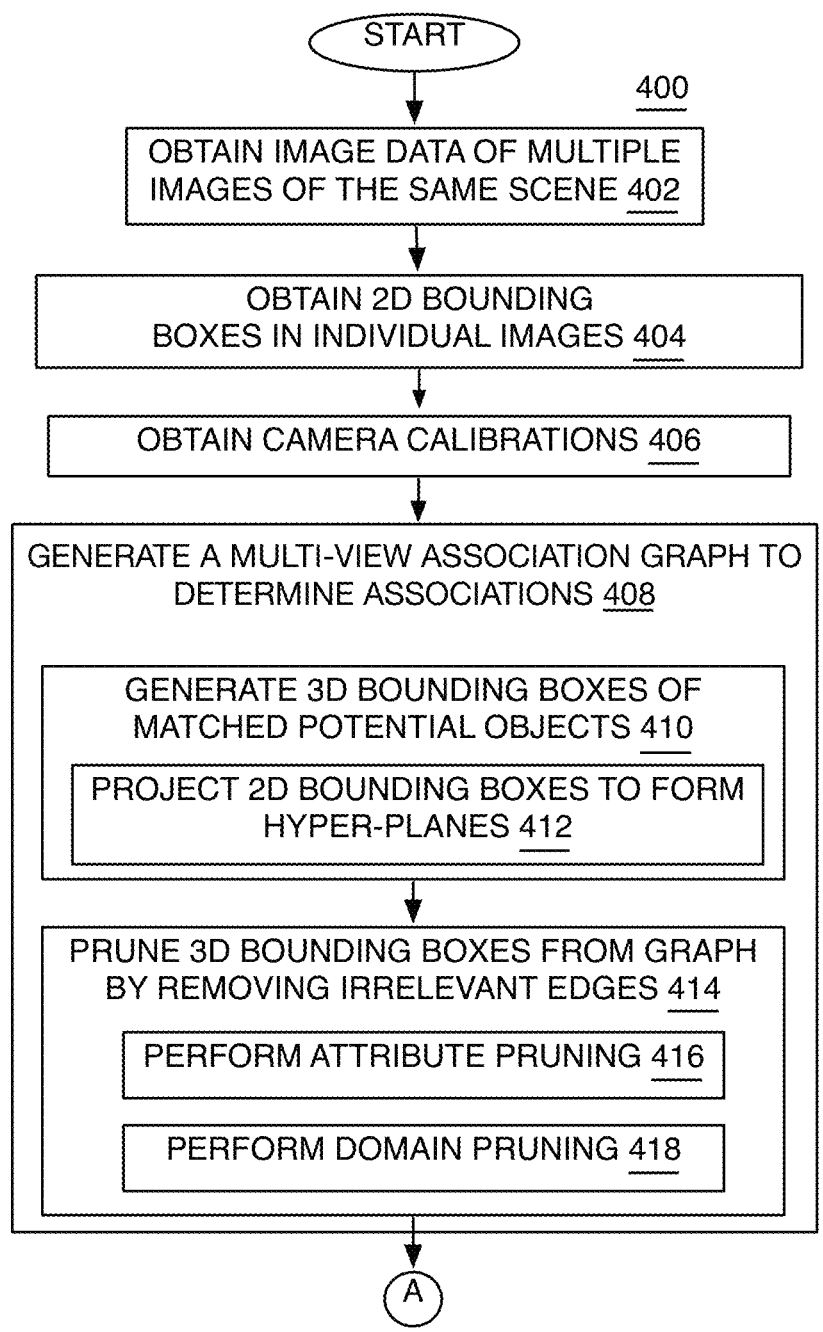

Referring to FIGS. 4A-4B, a process 400 is a method of image processing with multi-object multi-view association. In the illustrated implementation, process 400 may include one or more operations, functions or actions 402 to 432 generally numbered evenly. By way of non-limiting example, process 400 may be described herein with reference to example image processing system 700 of FIG. 7, and where relevant.

Process 400 may include "obtain image data of multiple images of the same scene" 402. This may involve obtaining multiple images of the same scene and at the same time (same or similar time stamp) as mentioned above. It will be understood that such images should be pre-processed sufficiently for object detection and MMVA operations. While the images may be captured by a camera array, it may be captured by a single or few moving cameras for a slow moving or fixed scene.

Figure 6:
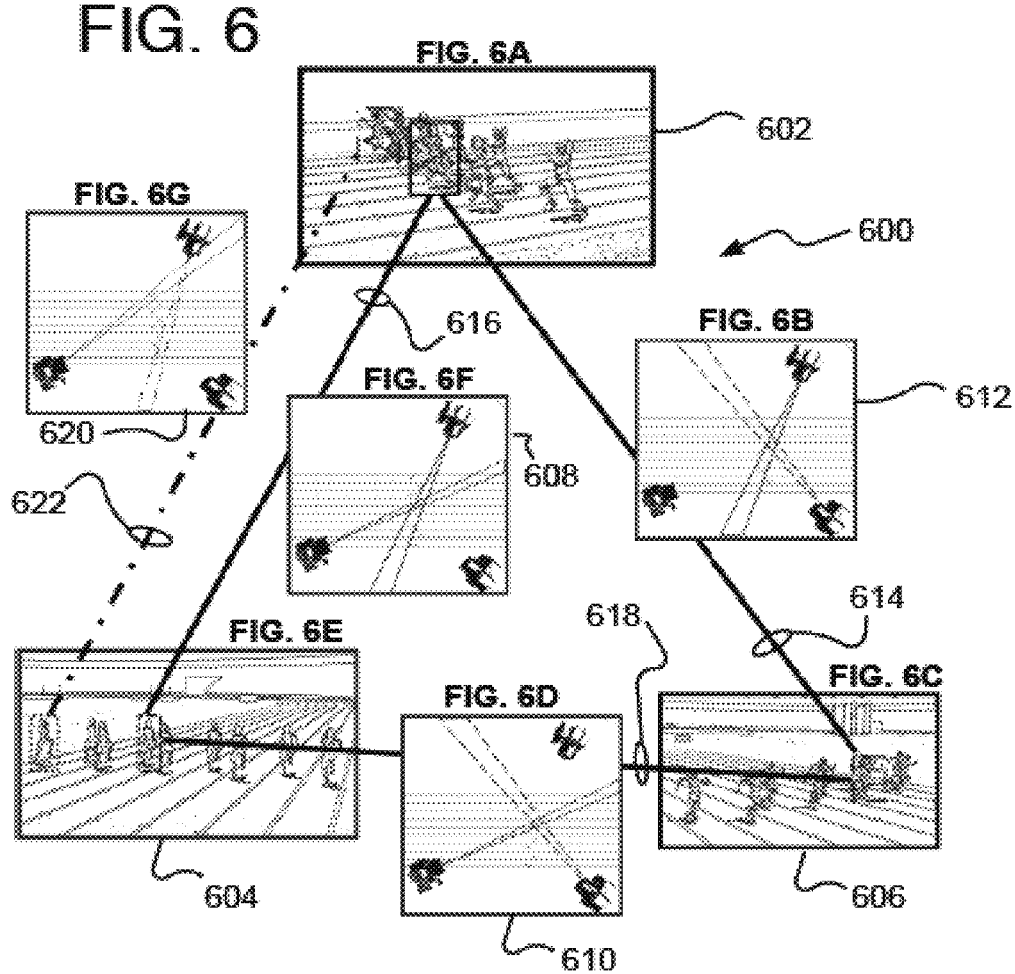
FIG. 6 is a schematic diagram of a graph formed of images and camera position views to explain edges between bounding box positions in accordance with at least one of the implementations disclosed herein.
Figure 6A:
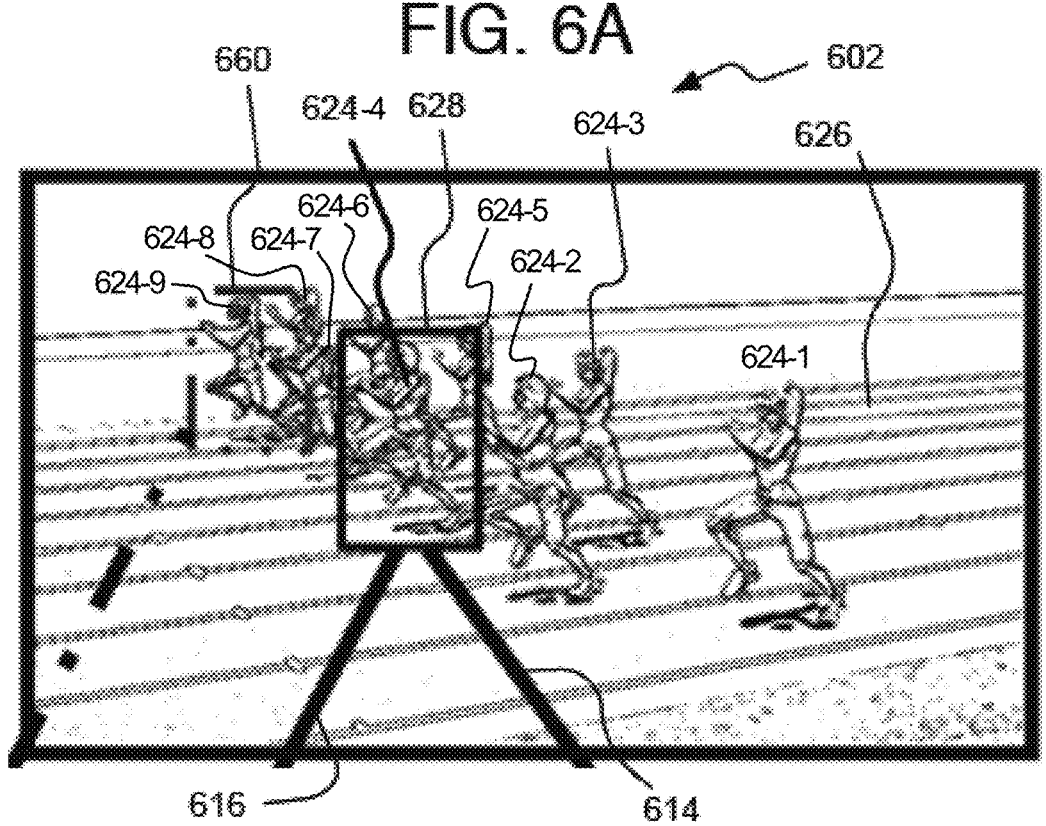
FIG. 6A is an image of the schematic diagram of FIG. 6.
Figure 6B:
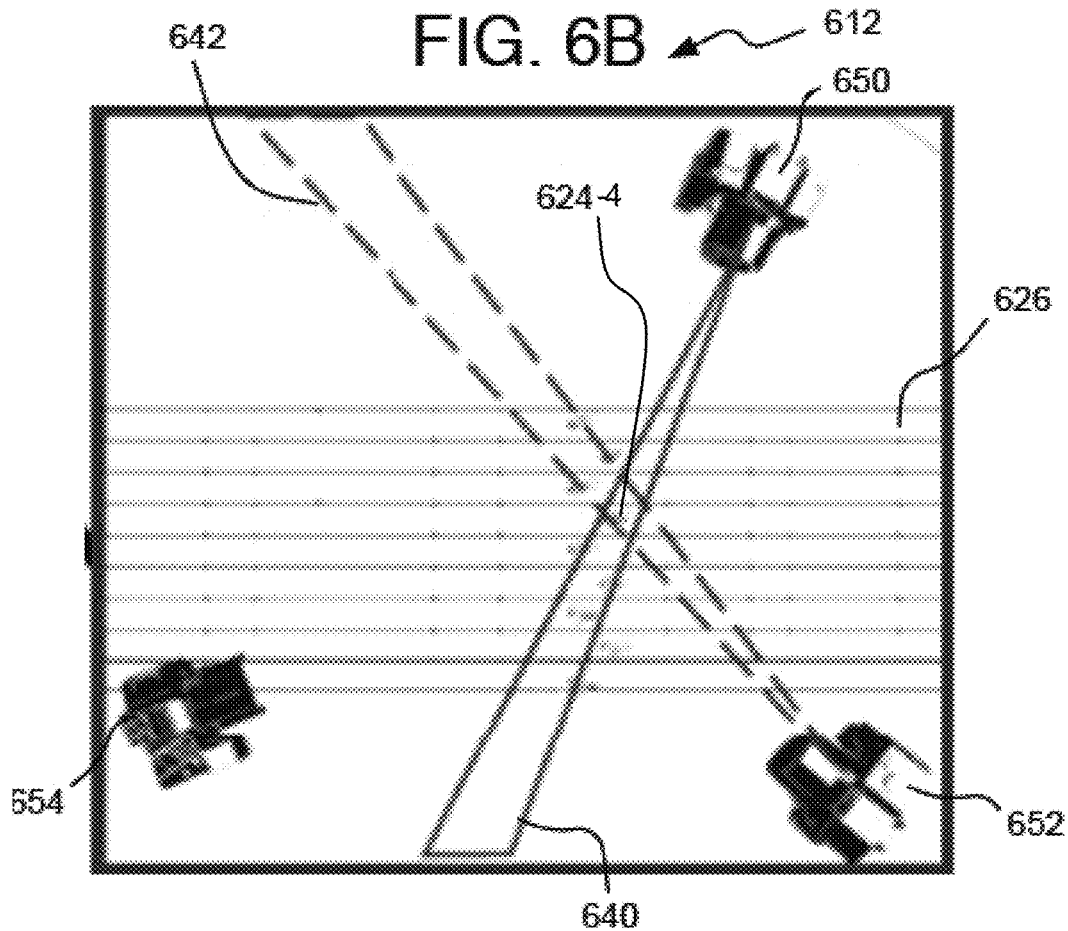
FIG. 6B is a camera position and projection line view of the schematic diagram of FIG. 6.
Figure 6C:
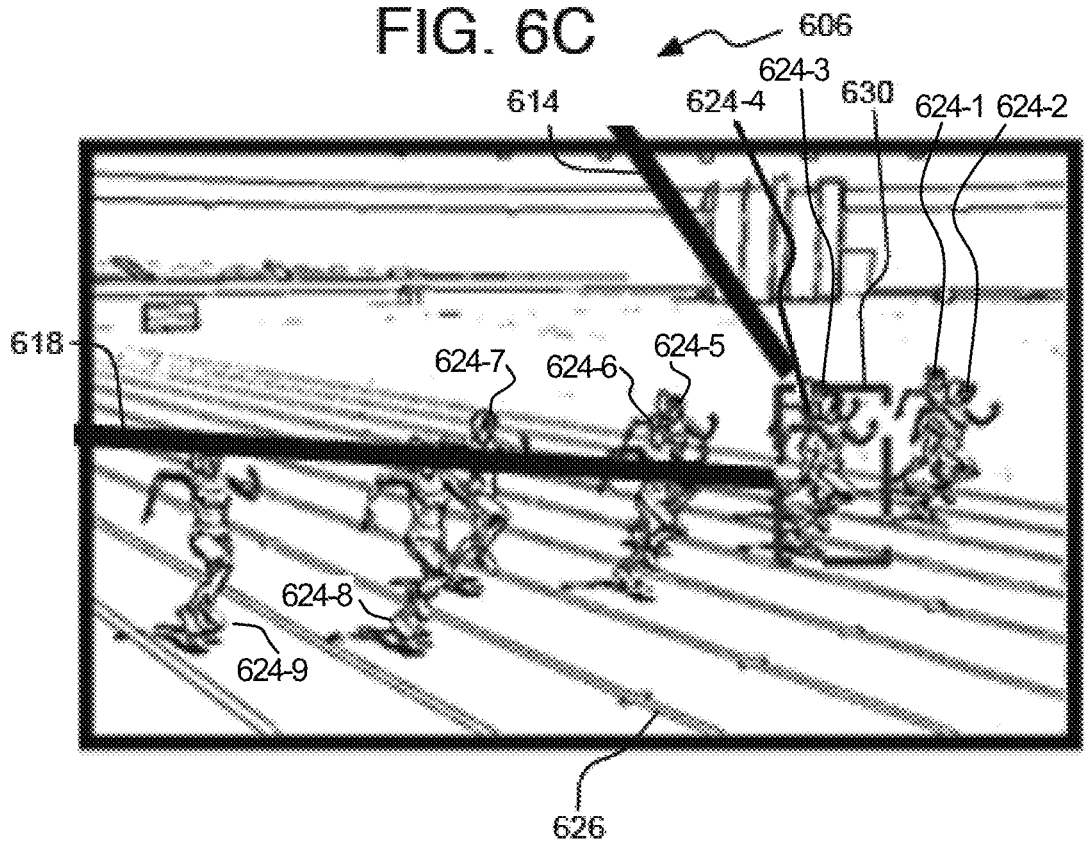
FIG. 6C is another image of the schematic diagram of FIG. 6.
Figure 6D:
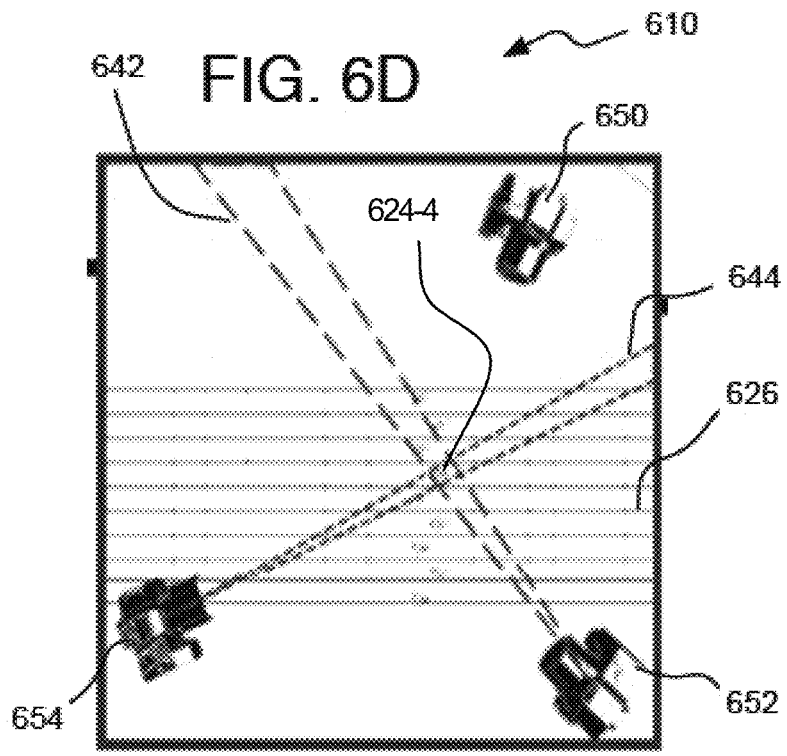
FIG. 6D is another camera position and projection line view of the schematic diagram of FIG. 6.
Figure 6E:
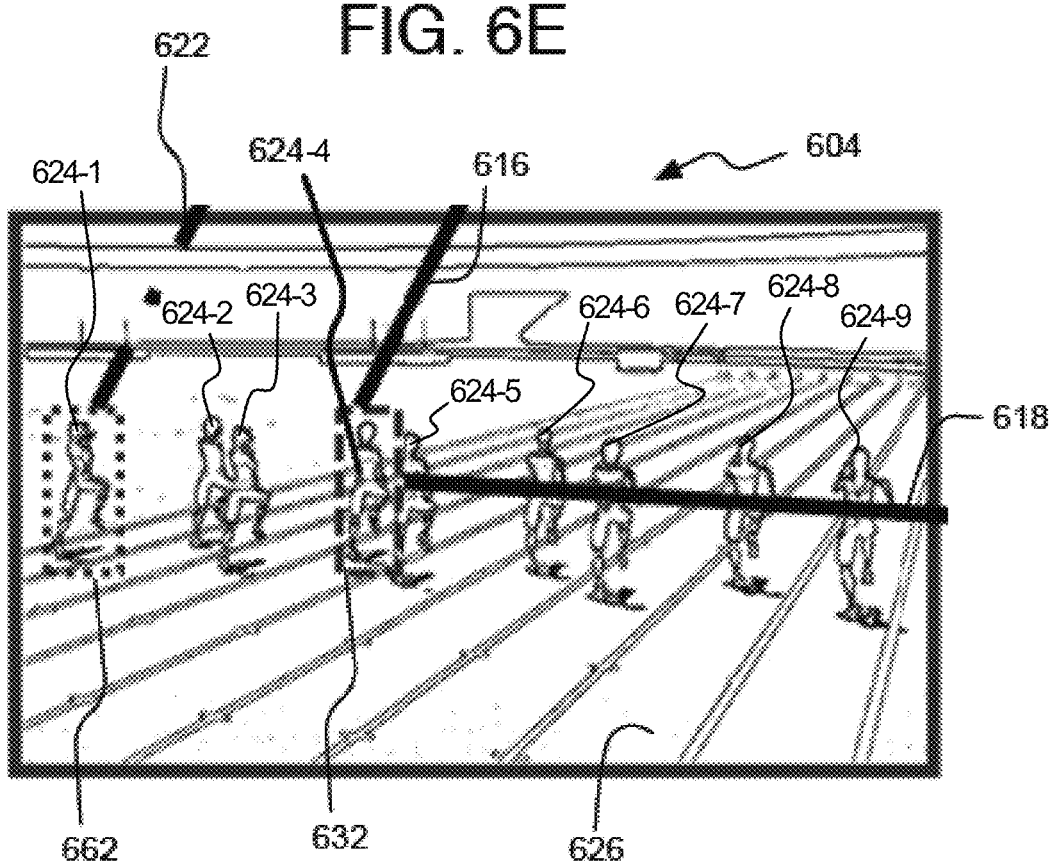
FIG. 6E is another image of the schematic diagram of FIG. 6.
Figure 6F:
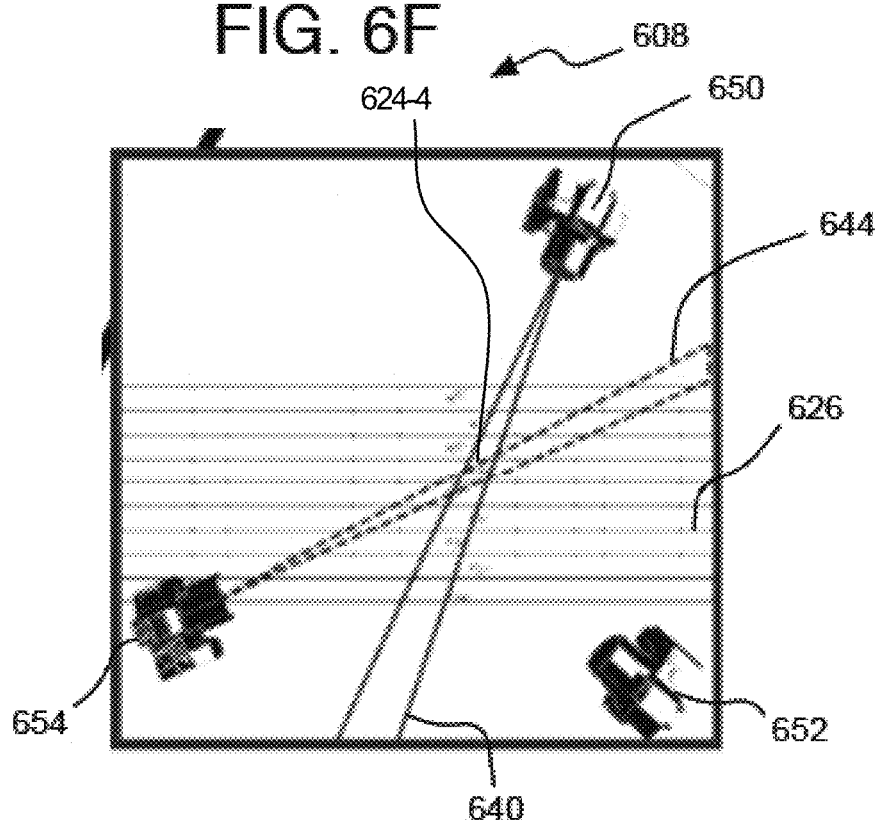
FIG. 6F is another camera position and projection line view of the schematic diagram of FIG. 6.
Figure 6G:
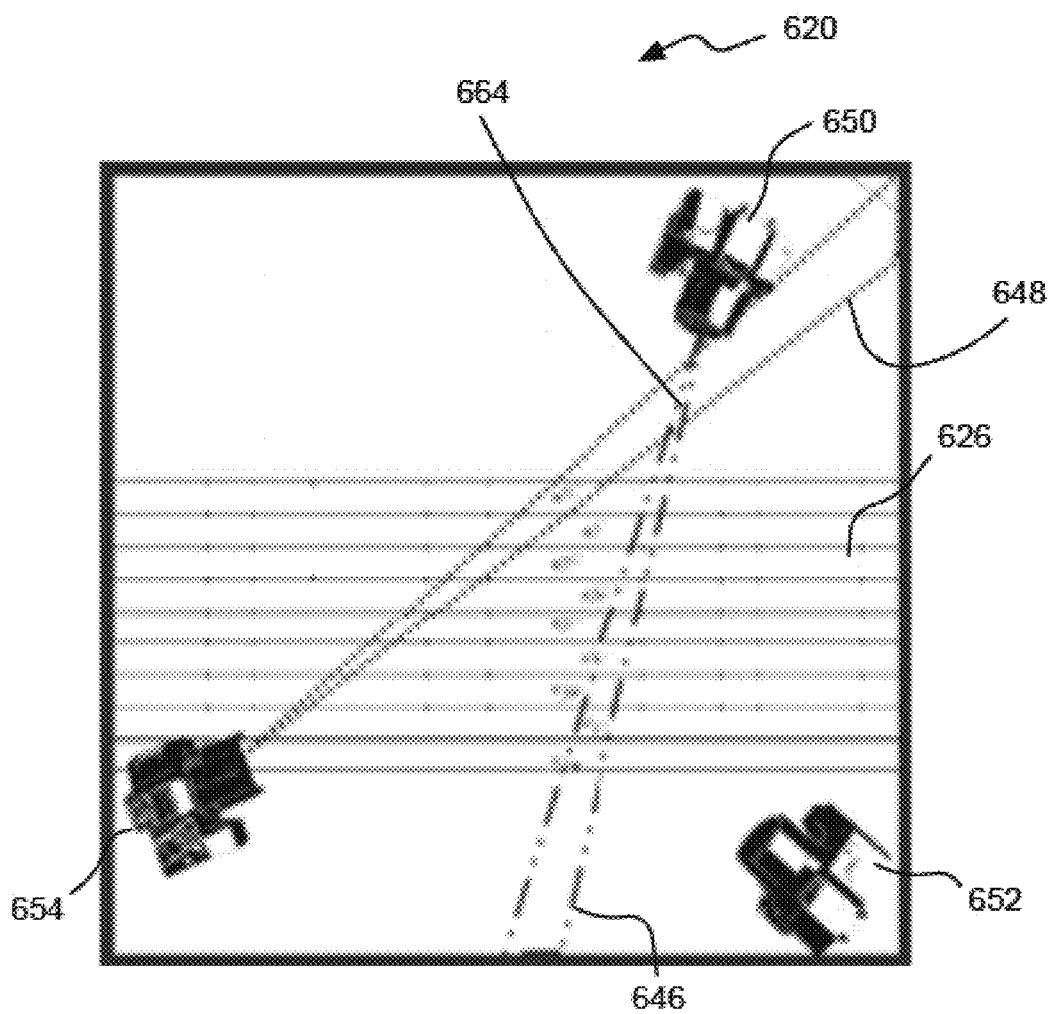
FIG. 6G is yet another camera position and projection line view of the schematic diagram of FIG. 6.

Referring to FIG. 6, an example setting 600, which may be or have a multi-view association graph, is used to explain process 400, and includes three images 602, 604, and 606 of the same scene from three different cameras (or camera positions) 650, 652, and 654 (see FIG. 6B) at three different perspectives including different locations and angles relative to the scene. Overhead perspectives 608, 610, 612, and 620 show camera positions for each of the images. A close up of each of the images and perspectives is shown on FIGS. 6A-6G. The example objects or subjects of interest here are nine athletes 624-1 to 624-9 in a running competition on a track 626. The association task is to find associations of each of the nine athletes across all three 2D images from each camera.

Process 400 may include "obtain 2D bounding boxes in individual images" 404. This may involve running object detection algorithms or networks with the image data of the 2D images. Such object detection operation may be performed by neural networks provided for such tasks. The results are a region-of-interest 2D bounding box around each subject of interest. In the present example, initial 2D bounding boxes 628, 630, and 632 are shown for a subject 624-4 of the nine subjects 624-1 to 624-9, and in each of the three images 602, 604, and 606. This is repeated for each subject 624-1 to 624-9 that is to be associated and tracked, and in this example, for each of the nine athletes 624-1 to 624-9 shown in the images 602, 604, and 606.

Process 400 may include "obtain camera calibrations" 406. Thus, by one form, the camera positions are fixed or otherwise known so that the camera position and orientation (or optical axis of each camera) relative to each other can be obtained for computations. This may include relative x, y, and z translation positions in a 3D space around the scene as well as angles or other indicators of yaw, pitch, and roll of each camera.

Process 400 may include "generate a multi-view association graph to determine associations" 408. The graph 600 may be formed of 2D bounding boxes at the nodes or vertices of the graph and potential edges connecting the nodes where the edges are verified by the process herein. The generation of the graph may include operations 410 to 430 below.

Process 400 then may include "generate 3D bounding boxes of matched potential objects" 410. Here, 3D bounding boxes are created that represent a potential approximate location and volume of the subject to be tracked. The 3D bounding boxes are generated at an intersection of two projection cones originating from pairs of two 2D bounding boxes each from a different 2D image, and that are formed by projecting vertices of the 2D bounding boxes into a common 3D space of the two images. The two 2D bounding boxes may be considered to be connected by an edge as will be described below with FIG. 6.

Figure 5:
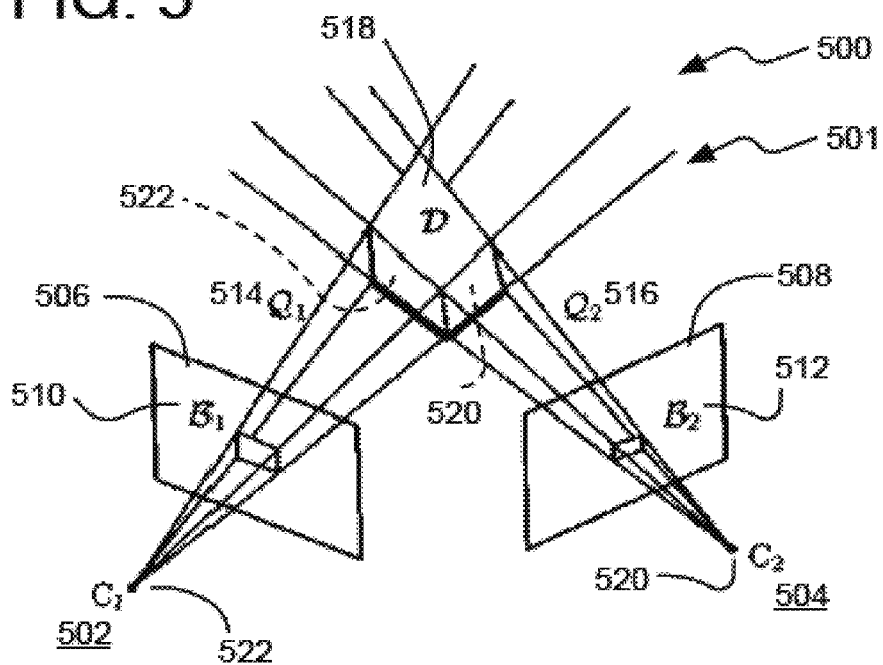
FIG. 5 is a schematic diagram to explain 3D bounding box construction in accordance with at least one of the implementations disclosed herein.

Referring to FIG. 5 for more detail, a projection setup 500 shows a 3D space 501, and two cameras C1 502 and C2 504, as well as their respective 2D images 506 and 508, facing the 3D space 501. The two images 506 and 508 respectively have subjects detected in two 2D bounding boxes B1 510 and B2 512. Assuming the images are of the same scene and the two bounding boxes B1 510 and B2 512 could be for the same subject, a 3D bounding box D 518 may correspond to the association of the subject of 2D bounding box B1 510 and a subject of 2D bounding box B2 512.

To generate the 3D bounding box D 518 in the 3D space 501, process 400 may include "project 2D bounding boxes to form hyper-planes" 412. This includes projecting the vertices of the 2D bounding boxes B1 510 and B2 512 into the 3D space 501 to form the projection cones Q1 514 and Q2 516, and projected from each camera's vanishing point on the cameras' optical axes. The intersection of the two cones Q1 514 and Q2 516 forms visible hyper-planes 520 and 522, thereby forming the sidewalls of the 3D bounding box 518. The projection of the cones Q1 514 and Q2 516 also may be considered to form all six sides of the 3D bounding box D 518 by the projection lines where some of the back sides of the 3D bounding box D 518 are not shown.

The 3D bounding box construction may be repeated for many or every pair of 2D bounding boxes on two different images with the same scene. Thus, this operation forms a graph of a 3D space with a 3D bounding box for each pair of 2D bounding boxes from different images, and where each pair of 2D bounding boxes form an edge.

Process 400 may include "prune 3D bounding boxes from graph by removing irrelevant edges" 414. To reduce computational load (or cost) once the 3D bounding boxes are constructed on the graph or 3D space 501, the system can check to determine whether or not the 3D bounding boxes meet at least some minimal characteristic conditions or criteria to be an associated subject that should be tracked. The conditions factor distinct features of the 3D bounding boxes and can be easily tailored to specific scenarios or environments. By one form, the conditions may be related to 3D geometry such as an approximate location and volume of the potential subject in the 3D space or graph.

By one example then, process 400 may include "perform attribute pruning" 416. This relates to attributes of the subjects that are expected to be bounded by the 3D bounding box, and may be based on general knowledge about the subject. Thus, in the present example here where the 3D bounding box should have a person such as one of the nine athletes 624-1 to 624-9, the size of the 3D bounding box can be limited to the general size, volume, height, and so forth related to a person. This would consider any geometrical tolerances such as camera perspective, distance from the camera, and so forth. Those 3D bounding boxes that are not deemed to be about the size of a person when tolerances are considered will be pruned or dropped form the graph of the 3D space.

Also regarding the pruning, process 400 may include "perform domain pruning" 418. Here, the knowledge of the subjects may be related to domain knowledge for further tailoring of the minimal conditions. In this example, the domain is a location or environment such as an athletic field of play (FoP) which could be an approximate rectangular field for soccer, American football, rugby, baseball, basketball, swimming, or more complex shapes such as an oval race track 626 in a stadium as in the present example, or even an irregular outdoor vehicle or foot race track. This may be performed by having predetermined locations and dimensions of the FoP relative to the camera positions and orientations, and then by adding hyperplanes of the FoP to the 3D space graph where the 3D bounding boxes are located. Once the FoP is established, the system may prune the 3D bounding boxes creating potential subjects outside of the FoP (non-athletes), or even false positives where the 3D bounding box is below the ground for example. It also will be appreciated that other domains may be used that are not related to athletics such as within a building or room or at a particular outside area with many different desired dimensions. Those 3D bounding boxes that are pruned have their edge pruned so that the 2D bounding boxes forming that edge, if already established, and 3D bounding box are no longer consider an associated pair of a same subject, even though the 2D bounding boxes of that pair may have edges to other 2D bounding boxes that still remain.

Referring to FIG. 6 again and FIGS. 6A-6G, once the pruning is complete for the 3D bounding boxes, process 400 may include "determine likelihood potential association is an actual association" 420. This operation involves generating an association or edge weight to determine whether there is a high likelihood that subjects on two different images are the same.

With regard to the setting or graph 600, the multi-view association method here involves mapping the problem using a graph clustering type of technique. More precisely, each of the 2D bounding boxes is mapped onto a vertex of the multi-view association graph 600, and where each instance of a subject in an image is considered a separate or unique vertex. Edges, as lines, 614, 616, and 618 are then added as connections between vertices and corresponding to potentially shared subjects of different cameras as shown on the camera perspective views 608, 610, and 612, which are all top views of the cameras. For example, subject 624-4 in image 602 forms a single vertex and is in 2D bounding box 628 (best shown on FIG. 6A). Edge 614 shows a potential association or match between 2D bounding box 632 in image 604 (FIG. 6E) and 2D bounding box 628, and edge 616 shows a potential match between 2D bounding box 630 in image 606 (FIG. 6C) and 2D bounding box 628. Perspective view 608 (best shown on FIG. 6F) shows how both cameras 650 and 654 respectively form crossing rays (or field of view (FoV) beams)) 640 and 644 at subject 624 shown in top view here, and to form edge 616. Likewise, perspective 612 (FIG. 6B) provides the camera positioning forming crossing FoV beams for edge 614, and perspective 610 (FIG. 6D) shows the camera positioning for edge 218 matching 2D bounding box 632 (image 604 on FIG. 6E) and 2D bounding box 630 (image 606 on FIG. 6C).

In this example with nine athletes as the subjects in each image and with three images (or three cameras) and therefore three 2D bounding boxes per subject, then there should be 9*3 for 27 correct vertices connected by edges as mentioned and similar to that shown on FIG. 6. It will be understood that no edges can connect 2D bounding boxes between vertices corresponding to the same camera (or same image) since edges represent potential association of the two 2D bounding boxes on different images. Since a match or association is tested between each of the subjects to the 2D bounding boxes of all of the other eight subjects, this results in 9*9*3 for 243 potential edges in total. Within this formulation, finding associations of 2D bounding boxes is similar to finding maximal cliques within this graph and this is explained in greater detail below.

To show an example where the association fails and the edge is removed, perspective 620 (FIG. 6G) shows cameras 650 and 654 with FoV beams 646 and 648 that cross at an object 664 and to form an edge 622 potentially matching 2D bounding boxes (or vertices) 662 and 660 on image 604 (FIG. 6E) and image 602 (FIG. 6A), respectively. The object 662 is located off of the racing track 626, which is the desired domain in this case. Thus, edge 622 and corresponding potential match of 2D bounding boxes 660 and 662 of object 664 will be dropped.

Once, or as, validated potential edges are established, the edge weights of the graph 600 are computed. It is determined in a way to reflect relevant information about the likelihood that the two vertices connected by an edge and corresponding to 2D bounding boxes originated from the same subject (or here athlete). In other words, weights are generated for the edges that reflect a probability of association between the subjects in the 2D bounding boxes connected by an edge and so that the edge can be evaluated. The information includes differences or overlaps between representations of the 3D bounding boxes (in the form of re-projected 2D bounding boxes) and the original or initial 2D bounding boxes on the 2D images. This eliminates edges of the 2D bounding boxes from the 2D images that are not relevant to 3D bounding boxes of subjects that are targeted to be tracked. The 2D bounding box could also be removed from 2D image data for example when no other potential edges extend from a 2D bounding box.

Thus, in order to determine edge weights, process 400 may include "re-project 3D bounding boxes to 2D images" 422. Here the corners of the 3D bounding box are re-projected back to each of the 2D images in the inverse operation of the forward projection explained with the projection setup 500 (FIG. 5), and the re-projection is a simple projection (by known methods) of bounding boxes in 3D onto a 2D plane (here the image plane of each camera perspective). The result of the re-projection of the 3D bounding boxes onto the 2D images will generate a re-projection 2D bounding box on each image, and in turn for each camera, and for each 3D bounding box that remained after the pruning. The 2D re-projection may be represented as two opposite corners of a rectangular bounding box for example, or other locating coordinates may be used.

Process 400 may include "calculate overlap of re-projected and initial 2D bounding boxes" 424. Here, a similarity between the re-projection and initial 2D bounding boxes are determined and represent the probability of the subjects being the same. The probabilities or overlaps can then be used to generate edge weights. To represent the calculation of the overlaps mathematically, for an edge connecting two nodes (or vertices) in the form of initial 2D bounding boxes, let $B_{C_k}^i$ be an initial 2D bounding box bounding detected subject (or here athlete) i on camera or image $C_k$. Also let $B_{C_l}^j$ be an initial 2D bounding box bounding detected subject (or here athlete) j on camera or image $C_l$. A 3D bounding box designated $D(B_{C_k}^i, B_{C_l}^j)$ is re-projected back to the two cameras (or images) $C_k$ and $C_l$, respectively resulting in new re-projection 2D bounding boxes designated: $\widetilde{B_{C_k}^i}$ and $\widetilde{B_{C_l}^j}$. If $B_{C_k}^i$ and $B_{C_l}^j$ correspond to the same subject (or here athlete), assuming perfect calibration, object detection and frame synchronization, the 2D projection of the resulting 3D bounding box will have the same size and position as the initial 2D bounding box, and the re-projection 2D bounding box $\widetilde{B_{C_k}^i}$ should perfectly overlap with the original $B_{C_k}^i$ for example. In a realistic scenario accounting for all errors, the bigger the overlap, the bigger the probability that $B_{C_k}^i$ and $B_{C_l}^j$ originated from the same subject.

The system measures the overlap of the initial and re-projection 2D bounding box by determining an intersection over union (IoU) measure, where a ratio between areas of intersection and union of the two 2D bounding boxes (initial and re-projection) is computed by:

$$IoU\left(\widetilde{B_{(C_k)}^i}, B_{(C_k)}^i\right) = \frac{\widetilde{B_{(C_k)}^i} \cap B_{(C_k)}^i}{\widetilde{B_{(C_k)}^i} \cup B_{(C_k)}^i} \quad (1)$$

This may be repeated for each 3D bounding box maintained after pruning and every pair of remaining initial 2D bounding boxes that still have an edge after irrelevant edges were removed as described above.

Then, process 400 may include "use overlap value to determine edge weights" 426. The edge weights may be generated using the overlaps in many different ways. By one form, this operation may include "determine edge weight as combination of overlaps of pair of objects on two different 2D images" 428. Specifically, one example formula for the edge weight w( ) of an edge between two 2D bounding boxes on the two images at nodes $B_{C\_k}^i$ and $B_{C\_l}^j$ is the average of the IoUs (or overlaps) for the 2D bounding boxes (or two cameras or images $C_k$ and $C_l$). The equation may be written as:

$$w(B_{(C_k)}^i, B_{(C_l)}^j) = \frac{1}{2}(IoU(\widetilde{B_{C_k}^i}, B_{(C_k)}^i) + IoU(\widetilde{B_{C_l}^j}, B_{(C_l)}^j)) \quad (2)$$

It will be appreciated that other combinations of the two overlaps of the two 2D bounding boxes forming an edge may be used instead of an average, such as a maximum overlap, minimum overlap, and many others.

Process 400 may include "use edge weight to determine which objects are to have the same identifier" 430. Here, by one form, each edge weight may be compared to a threshold, and any edge under a threshold is removed so that the two 2D bounding boxes of the edge are not assigned the same identifier due to that edge. The threshold may be determined by experimentation.

Then, a maximal clique technique may be used. In this case, a clique here may be a sub-graph where all the nodes are connected with each other. Finding a maximal clique is finding a clique that has the strongest "connection" that is expressed as a sum of all weights of edges within the clique. By one form, the sum of the edge weights of the connections in a clique are to meet a criteria, such as being over a threshold, or being higher than the sum of other potential maximal cliques. In the present example with nine subjects and three cameras, and in an ideal situation, there should be nine cliques of three nodes each, each being a strongest connection for a specific 3D bounding box of the nine subjects. The ideal situation will be achieved depending on the accuracy of detections of the 2D bounding boxes on the images and the quality of the calibration of the cameras. A number of algorithms are known for finding maximal cliques.

Thereafter, process 400 may include "use verified detected objects for further applications" 432. By one form, once the associations of the objects are established on the 2D images and the same identifier is provided to the same object on the 2D images, the association data may be provided to further applications that use the data such as those already mentioned above such as for determining 2D and 3D points for measurement of subject performance metrics, computer vision, AI, or scene understanding, virtual reality, and so forth.

In addition, any one or more of the operations of FIGS. 2, 3A, 3B and 4A-4B may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 7:
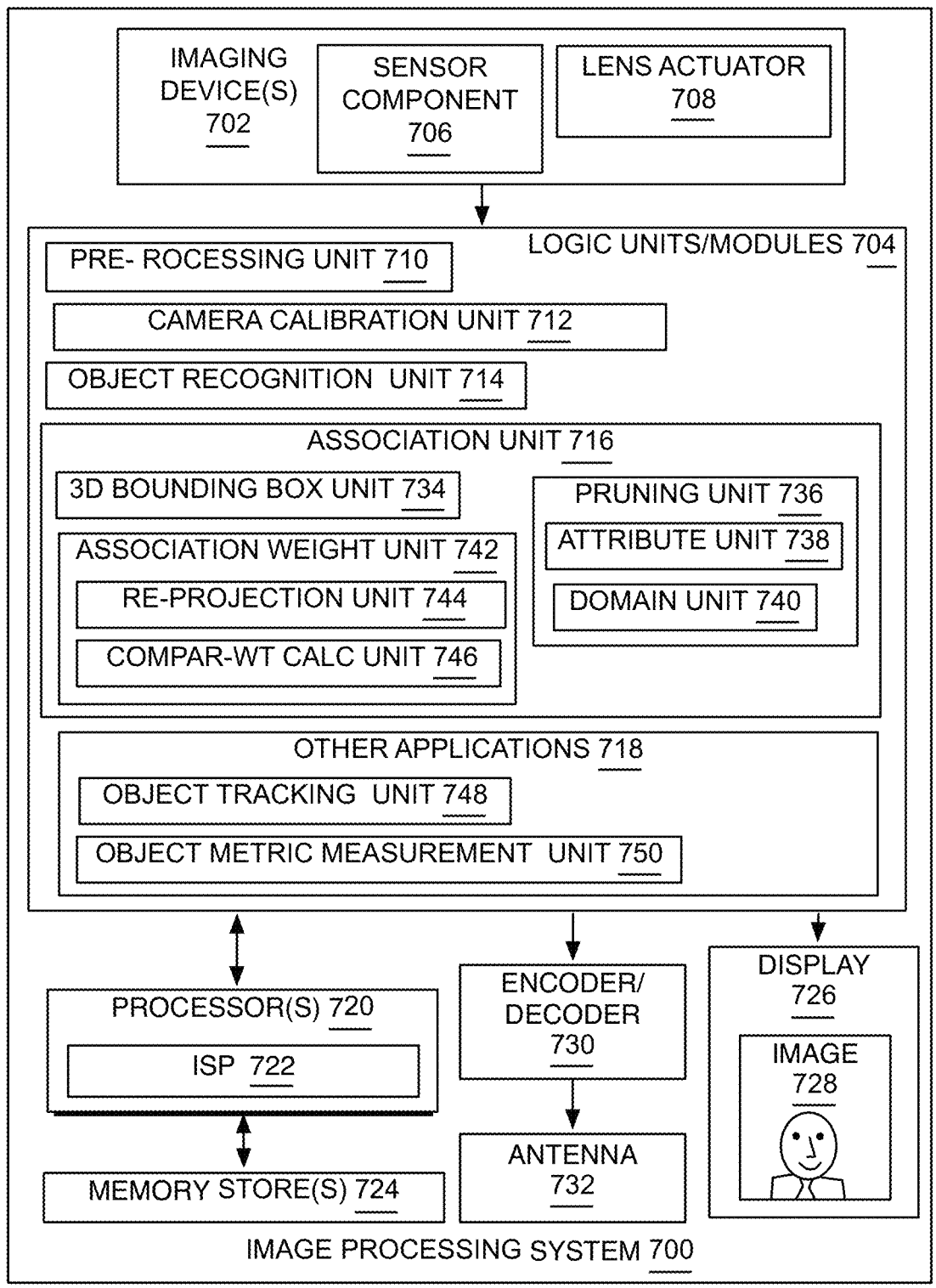
FIG. 7 is an illustrative diagram of an example system.

Referring to FIG. 7, an example image processing system 700 is arranged in accordance with at least some implementations of the present disclosure. In various implementations, the example image processing system 700 may have an image processing system or device 702 to form or receive captured image data and analyze the image data. This can be implemented in various ways. Thus, in one form, the image processing system 700 may be one or more cameras or other image capture devices, and imaging device 702, in this case, may be the camera hardware and camera sensor software, module, or component 704. In other examples, image processing system 700 may have an imaging device 702 that includes or may be one or more cameras, and logic modules 704 may communicate remotely with, or otherwise may be communicatively coupled to, the imaging device 702 for further processing of the image data.

Thus, image processing system 700 may be a device with one or more cameras of a camera array such as that placed around a stadium to record athletes but could be placed around other environments. Otherwise, the camera array could be placed on a multi-use device such as a smartphone, tablet, laptop, or other mobile device, or even a computer or other computing device. Also, imaging device(s) 702 may be a tablet or other device with multiple cameras where the image processing including the MMVA processing occurs at one of the cameras or at a separate processing location communicating with one or more of the cameras, where the processing location may be remote from the one or more cameras, and any of the devices mentioned herein may be mobile devices.

In any of these cases, such technology may include a camera such as a digital camera system, a commercial camera or television camera, a dedicated camera device, or an imaging phone or tablet, whether a still picture or video camera, or some combination of these. Thus, in one form, imaging device 702 may include camera hardware and optics including one or more sensors as well as auto-focus, zoom, aperture, ND-filter, auto-exposure, flash, and actuator controls. These controls may be part of a sensor module or component 706 for operating the sensor. The sensor component 706 may be part of the imaging device 702, or may be part of the logical modules 704 or both. Such sensor component can be used to generate images for a viewfinder and take still pictures or video. The imaging device 702 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 702 may be provided with an eye tracking camera.

The imaging device 702 also may have a lens actuator 708 that has a lens and a lens driver or driver logic that receives commands to move the lens and applies an electrical current to move the lens. The imaging device 702 may have any other relevant component for capturing images consistent with the method and system described herein.

In the illustrated example, the logic modules 704 may include a pre-processing unit 710 that receives and modifies raw image data for further processing and as described above. The logic units or modules 704 also may include a camera calibration unit 712 that provides camera calibration data such as distances and relative orientation data between cameras as well as any other calibration data necessary for performing the MMVA and other image processing described herein. The camera calibration unit 712 may be involved in generating or predetermining the calibration data, offline for example, or may simply obtain the calibration data. Otherwise, the logic units or modules 704 may include an object recognition unit 714 that may have all necessary units for forming 2D bounding boxes as described above, and an association unit 716 to perform the MMVA tasks described above. Then, other applications 718 may be present that use the association data. More specifically, the association unit 716 may have a 3D bounding box unit 734, a pruning unit 736 with an attribute unit 738 and domain unit 740, and an association weight unit 742 that has a re-projection unit 744 and a comparison and weight calculation unit 746. The other applications 718 that may be provided by the logic units or modules 704 may be an object tracking unit 748 that tracks the associated objects and an object metric measurement unit 750. These units are titled so that the units are clearly associated with the operations in the methods described above.

The logic modules 704 may or may not be located physically separate from the imaging device, and regardless of any physical separation, the logic modules 704 still may be considered to be part of the imaging device or system when performing tasks on data provided by the imaging device. It will also be understood that any of these units may include any code or hardware that is used to perform the tasks suggested by the title of the unit, and may or may not actually be a physically separate object, or separate section of code, from other objects or code that perform other tasks.

The image processing system 700 may have one or more processors 720 which may include a dedicated image signal processor (ISP) 722 such as the Intel Atom, memory stores 724 which may or may not hold image data and/or MMVA related data, one or more displays 726 to provide images 728, encoder/decoder 730, and antenna 732. In one example implementation, the image processing system 700 may have the display 726, at least one processor 720 communicatively coupled to the display, and memory 724 communicatively coupled to the processor. The encoder/decoder 730 and antenna 732 may be provided to compress the image or MMVA date for transmission to other devices that may perform further analysis, display, or store the MMVA and/or image data. It will be understood that the encoder/decoder 730 may include a decoder to receive and decode image data for processing by the system 700, including MMVA operations by the association unit 716. As illustrated, any of these components may be capable of communication with one another and/or communication with portions of logic modules 704 and/or imaging device 702. Thus, processors 720 may be communicatively coupled to both the imaging devices 702 and the logic modules 704 for operating those components. By one approach, although image processing system 700, as shown in FIG. 7, may include one particular set of blocks or actions associated with particular components or modules, these blocks or actions may be associated with different components or modules than the particular component or module illustrated here.

Figure 8:
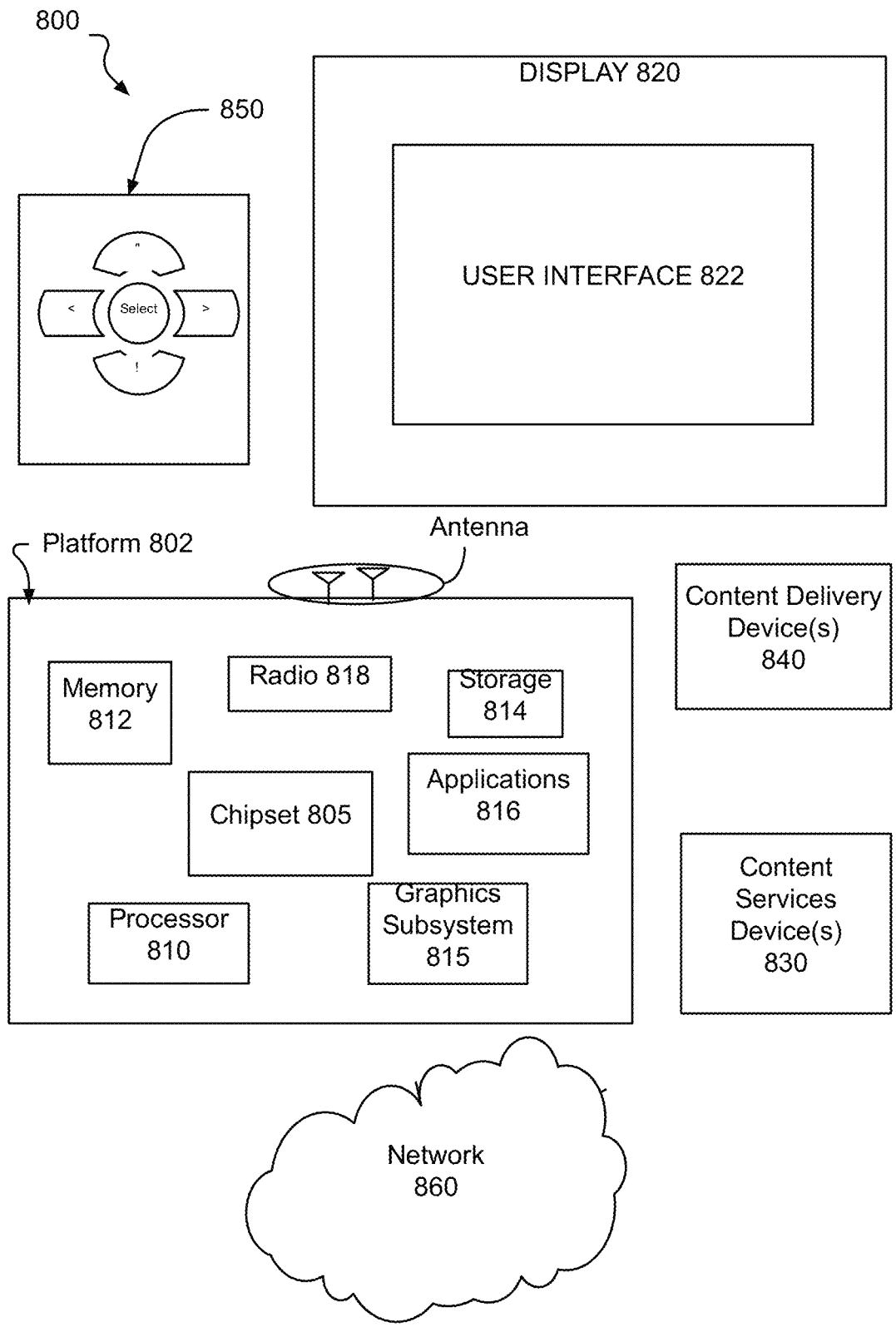
FIG. 8 is an illustrative diagram of another example system.

Referring to FIG. 8, an example system 800 in accordance with the present disclosure operates one or more aspects of the image processing system described herein. It will be understood from the nature of the system components described below that such components may be associated with, or used to operate, certain part or parts of the image processing system 700 described above. In various implementations, system 800 may be a media system although system 800 is not limited to this context. For example, system 800 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chip set 805 may include a storage adapter (not depicted) capable of providing intercommunication with storage 814.

Processor 810 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, Display Port, wireless HDMI, and/or wireless HD compliant techniques. Graphics subsystem 815 may be integrated into processor 810 or chipset 805. In some implementations, graphics subsystem 815 may be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In implementations, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In implementations, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various implementations, platform 802 and display 820 may be an integrated unit. Display 820 and content service device(s) 830 may be integrated, or display 820 and content delivery device(s) 840 may be integrated, for example. These examples are not meant to limit the present disclosure.

In various implementations, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 8.

Referring to FIG. 9, a small form factor device 900 is one example of the varying physical styles or form factors in which systems 700 or 800 may be embodied. By this approach, device 900 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 9, device 900 may include a housing with a front 901 and a back 902. Device 900 includes a display 904, an input/output (I/O) device 906, and an integrated antenna 908. Device 900 also may include navigation features 912. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone 914, or may be digitized by a voice recognition device. As shown, device 900 may include a camera 905 (e.g., including at least one lens, aperture, and imaging sensor) and a flash 910 integrated into back 902 (or elsewhere) of device 900. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, at least one non-transitory computer readable medium comprising instructions that, when executed, cause a computing device to operate by: obtaining image data of multiple images of the same scene from multiple cameras and with initial 2D bounding boxes of detected subjects; and generating a graph comprising: generating, by using the initial 2D bounding boxes, a plurality of three-dimensional (3D) bounding boxes each potentially of a subject to be tracked and generated without directly using pixel points forming the subject, pruning those of the 3D bounding boxes that do not meet at least one 3D bounding box characteristic, and generating an association weight that indicates a strength of association between two objects on two of the multiple images, and repeated for multiple pairs of different objects, wherein the weights are formed by using the 3D bounding boxes.

By one or more second implementation, and further to the first implementation, wherein the pruning comprises removing 3D bounding boxes that are not at least partly located within a pre-set domain.

By one or more third implementations, and further to the first or second implementation, wherein the pruning comprises removing 3D bounding boxes that do not meet a bounding box size or shape criteria.

By one or more fourth implementations, and further to any of the first to third implementation, wherein generating an association weight comprises forming a re-projection 2D bounding box by reprojecting one of the 3D bounding boxes back to the at least one image.

By one or more fifth implementations, and further to any of the first to fourth implementation, wherein generating the association weight comprises projecting a 3D bounding box to the two images of the two objects to form re-projection 2D bounding box on each of the two images, and generating an overlap that represents a comparison between the re-projection 2D bounding box and the initial 2D bounding box.

By one or more sixth implementations, and further to any of the first to fourth implementation, wherein generating the association weight comprises projecting a 3D bounding box to the two images of the two objects to form re-projection 2D bounding box on each of the two images, and generating an overlap that represents a comparison between the re-projection 2D bounding box and the initial 2D bounding box, and wherein the overlap is computed by using both the intersection and union of a re-projection 2D bounding box and an initial 2D bounding box.

By one or more seventh implementations, and further to any of the first to fourth implementation, wherein generating the association weight comprises projecting a 3D bounding box to the two images of the two objects to form re-projection 2D bounding box on each of the two images, and generating an overlap that represents a comparison between the re-projection 2D bounding box and the initial 2D bounding box, and wherein generating the association weight comprises combining overlaps of the two objects.

By one or more eighth implementations, and further to any of the first to fourth implementation, wherein generating the association weight comprises projecting a 3D bounding box to the two images of the two objects to form re-projection 2D bounding box on each of the two images, and generating an overlap that represents a comparison between the re-projection 2D bounding box and the initial 2D bounding box, and wherein generating the association weight comprises combining overlaps of the two objects, and wherein the overlaps of the two objects are averaged to form the association weight.

By one or more ninth implementations, a system comprises memory; and at least one processor communicatively connected to the memory and being arranged to operate by: obtaining image data of multiple images of the same scene from multiple cameras and with initial 2D bounding boxes of detected subjects; and generating a graph comprising: generating, by using the initial 2D bounding boxes, a plurality of three-dimensional (3D) bounding boxes each potentially of a subject to be tracked and generated without directly using pixel points forming the subject, pruning those of the 3D bounding boxes that do not meet at least one 3D bounding box characteristic, and generating an association weight that indicates a strength of association between two objects on two of the multiple images, and repeated for multiple pairs of different objects, wherein the weights are formed by using the 3D bounding boxes.

By one or more tenth implementations, and further to the ninth implementation, wherein generating the association weight comprises projecting a 3D bounding box to at least the two images of the two objects to form re-projection 2D bounding box on each of the two images, and generating an overlap that represents a comparison between the re-projection 2D bounding box and the initial 2D bounding box at each of the two images.

By one or more eleventh implementations, and further to the ninth implementation, wherein generating the association weight comprises projecting a 3D bounding box to at least the two images of the two objects to form re-projection 2D bounding box on each of the two images, and generating an overlap that represents a comparison between the re-projection 2D bounding box and the initial 2D bounding box at each of the two images, and wherein the overlap is computed by computing the intersection over union of a re-projection 2D bounding box and an initial 2D bounding box.

By one or more twelfth implementations, and further to the ninth implementation, wherein generating the association weight comprises projecting a 3D bounding box to at least the two images of the two objects to form re-projection 2D bounding box on each of the two images, and generating an overlap that represents a comparison between the re-projection 2D bounding box and the initial 2D bounding box at each of the two images, and wherein generating the association weight comprises combining overlaps of the two objects.

By an example thirteenth implementation, and further to the ninth implementation, wherein generating the association weight comprises projecting a 3D bounding box to at least the two images of the two objects to form re-projection 2D bounding box on each of the two images, and generating an overlap that represents a comparison between the re-projection 2D bounding box and the initial 2D bounding box at each of the two images, and wherein generating the association weight comprises combining overlaps of the two objects, and wherein the overlaps of the two objects are averaged to form the association weight.

By one or more fourteenth implementations, and further to the ninth implementation, wherein generating the association weight comprises generating an association weight for each pair of objects on different images.

By one or more fifteenth implementations, and further to the ninth implementation, wherein generating the association weight comprises generating an association weight for each pair of objects on different images, and wherein the at least one processor is arranged to operate by providing the same identifier to objects that share a same association weight that is over a threshold or is part of a clique of connections that meet a criteria or both.

By one or more sixteenth implementations, a computer-implemented method of image processing, comprises obtaining image data of multiple images of the same scene from multiple cameras and with initial 2D bounding boxes of detected subjects; and generating a graph comprising: generating, by using the initial 2D bounding boxes, a of three-dimensional (3D) bounding boxes each potentially of a subject to be tracked and generated without directly using pixel points forming the subject, pruning those of the 3D bounding boxes that do not meet at least one 3D bounding box characteristic, and generating an association weight that indicates a strength of association between two objects on two of the multiple images, and repeated for multiple pairs of different objects, wherein the weights are formed by using the 3D bounding boxes.

By one or more seventeenth implementations, and further to the sixteenth implementation, wherein the pruning comprises removing 3D bounding boxes that are not at least partly located within a pre-set domain.

By one or more eighteenth implementations, and further to the sixteenth implementation, wherein the pruning comprises removing 3D bounding boxes that do not meet a bounding box size or shape criteria.

By one or more nineteenth implementations, and further to the sixteenth implementation, wherein generating the association weight comprises projecting a 3D bounding box to the two images of the two objects to form re-projection 2D bounding box on each of the two images, and generating an overlap that represents a comparison between the re-projection 2D bounding box and the initial 2D bounding box at each of the two images.

By one or more twentieth implementations, and further to the sixteenth implementation, wherein generating the association weight comprises projecting a 3D bounding box to the two images of the two objects to form re-projection 2D bounding box on each of the two images, and generating an overlap that represents a comparison between the re-projection 2D bounding box and the initial 2D bounding box at each of the two images, and wherein the pruning comprises removing 3D bounding boxes that do not meet a bounding box size or shape criteria.

By one or more twenty-first implementations, and further to the sixteenth implementation, wherein generating the association weight comprises projecting a 3D bounding box to the two images of the two objects to form re-projection 2D bounding box on each of the two images, and generating an overlap that represents a comparison between the re-projection 2D bounding box and the initial 2D bounding box at each of the two images, and wherein generating the association weight comprises combining overlaps of the two objects.

By one or more twenty-second implementations, and further to the sixteenth implementation, wherein generating the association weight comprises projecting a 3D bounding box to the two images of the two objects to form re-projection 2D bounding box on each of the two images, and generating an overlap that represents a comparison between the re-projection 2D bounding box and the initial 2D bounding box at each of the two images, and wherein generating the association weight comprises combining overlaps of the two objects, and wherein the overlaps of the two objects are averaged to form the association weight.

By one or more twenty-third implementations, and further to the sixteenth implementation, wherein generating the association weight comprises generating an association weight for each pair of objects on different ones of the multiple images.

By one or more twenty-fourth implementations, and further to the sixteenth implementation, the method comprising providing the same identifier to objects with a same shared association weight that is over the threshold.

By one or more twenty-fifth implementations, and further to the sixteenth implementation, the method comprising providing the same identifier to objects of a clique of connections that meet a criteria.

In one or more twenty-sixth implementations, a device or system includes a memory and a processor to perform a method according to any one of the above implementations.

In one or more twenty-seventh implementations, at least one machine readable medium includes a plurality of instructions that in response to being executed on a computing device, cause the computing device to perform a method according to any one of the above implementations.

In one or more twenty-eighth implementations, an apparatus may include means for performing a method according to any one of the above implementations.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. At least one non-transitory computer readable medium comprising instructions to cause at least one processor circuit to at least:
    obtain initial two-dimensional (2D) bounding boxes of detected objects in multiple images of a scene from multiple cameras;
    project pairs of the initial 2D bounding boxes to generate a plurality of three-dimensional (3D) bounding boxes corresponding to intersections of the projected pairs of the initial 2D bounding boxes, the 3D bounding boxes potentially corresponding to one or more objects to be tracked;
    prune one or more of the 3D bounding boxes based on at least one 3D bounding box characteristic; and
    generate an association weight that represents a strength of association between two detected objects respectively in two images of the multiple images, the association weight based on projection of one of the 3D bounding boxes back to at least one of the two images to generate a re-projection 2D bounding box.

2. The at least one non-transitory computer readable medium of claim 1, wherein the instructions are to cause one or more of the at least one processor circuit to remove ones of the 3D bounding boxes that are not at least partly located within a pre-set domain.

3. The at least one non-transitory computer readable medium of claim 1, wherein the instructions are to cause one or more of the at least one processor circuit to remove ones of the 3D bounding boxes that do not meet at least one of a size criterion or a shape criterion.

4. The at least one non-transitory computer readable medium of claim 1, wherein the at least one of the two images is a first one of the two images, the re-projection 2D bounding box is a first re-projection 2D bounding box, and the instructions are to cause one or more of the at least one processor circuit to:
    project the one of the 3D bounding boxes back to a second one of the two images to form a second re-projection 2D bounding box; and
    generate an overlap that represents a comparison between the first re-projection 2D bounding box and a corresponding one of the initial 2D bounding boxes.

5. The at least one non-transitory computer readable medium of claim 4, wherein the overlap is based on at least one of an intersection or a union of the first re-projection 2D bounding box and the corresponding one of the initial 2D bounding boxes.

6. The at least one non-transitory computer readable medium of claim 1, wherein the instructions are to cause one or more of the at least one processor circuit to combine overlaps of the two detected objects to generate the association weight.

7. The at least one non-transitory computer readable medium of claim 6, wherein the instructions are to cause one or more of the at least one processor circuit to average the overlaps of the two detected objects to generate the association weight.

8. A system comprising:
    memory;
    instructions; and
    at least one processor circuit to be programmed by the instructions to:
        obtain initial two-dimensional (2D) bounding boxes of detected objects in multiple images of a scene from multiple cameras;
        project pairs of the initial 2D bounding boxes to generate a plurality of three-dimensional (3D) bounding boxes corresponding to intersections of the projected pairs of the initial 2D bounding boxes, the 3D bounding boxes potentially corresponding to one or more objects to be tracked;
        prune one or more of the 3D bounding boxes based on at least one 3D bounding box characteristic; and
        generate an association weight that represents a strength of association between two detected objects respectively in two images of the multiple images, the association weight based on (i) projection of one of the 3D bounding boxes to the two images to form a first re-projection 2D bounding box associated with a first one of the two images and a second re-projection 2D bounding box associated with a second one of the two images, and (ii) generation of an overlap based on the first re-projection 2D bounding box, a first one of the initial 2D bounding boxes associated with the first one of the two images, the second re-projection 2D bounding box, and a second one of the initial 2D bounding boxes associated with the second one of the two images.

9. The system of claim 8, wherein the overlap is based on an intersection over union of the first re-projection 2D bounding box and the first one of the initial 2D bounding boxes.

10. The system of claim 8, wherein one or more of the at least one processor circuit is to combine overlaps of the two detected objects to generate the association weight.

11. The system of claim 10, wherein one or more of the at least one processor circuit is to average the overlaps of the two detected objects to generate the association weight.

12. The system of claim 8, wherein one or more of the at least one processor circuit is to generate respective association weights for respective pairs of objects detected in different pairs of the multiple images.

13. The system of claim 12, wherein one or more of the at least one processor circuit is to provide a same identifier to objects that at least one of (i) share a same association weight that satisfies a threshold, or (ii) are part of a clique of connections that meet at least one criteria.

14. A computer-implemented method comprising:
obtaining initial two-dimensional (2D) bounding boxes of detected objects in multiple images of a scene from multiple cameras;
projecting pairs of the initial 2D bounding boxes to generate three-dimensional (3D) bounding boxes corresponding to intersections of the projected pairs of the initial 2D bounding boxes, the 3D bounding boxes potentially corresponding to one or more objects to be tracked;
pruning one or more of the 3D bounding boxes based on at least one 3D bounding box characteristic; and
generating, with at least one processor circuit programmed by at least one instruction, an association weight that represents a strength of association between two detected objects respectively in two images of the multiple images, the association weight based on (i) projecting one of the 3D bounding boxes to the two images to generate a first re-projection 2D bounding box associated with a first one of the two images and a second re-projection 2D bounding box associated with a second one of the two images, and (ii) generating an overlap based on the first re-projection 2D bounding box, a first one of the initial 2D bounding boxes associated with the first one of the two images, the second re-projection 2D bounding box, and a second one of the initial 2D bounding boxes associated with the second one of the two images.

15. The method of claim 14, wherein the pruning includes removing ones of the 3D bounding boxes that are not at least partly located within a pre-set domain.

16. The method of claim 14, wherein the pruning includes removing ones of the 3D bounding boxes that do not meet at least one of a size criterion or a shape criterion.

17. The method of claim 14, wherein the overlap is based on at least one of an intersection or a union of the first re-projection 2D bounding box and the first one of the initial 2D bounding boxes.

18. The method of claim 14, wherein the generating of the association weight includes combining overlaps of the two detected objects.

19. The method of claim 18, wherein the combining of the overlaps includes averaging the overlaps to generate the association weight.

20. The method of claim 14, wherein the generating of the association weight includes generating respective association weights for respective pairs of objects detected in different ones of the multiple images.

21. The method of claim 20, including providing a same identifier to objects with a same shared association weight that satisfies a threshold.

22. The method of claim 14, including providing a same identifier to objects of a clique of connections that meet at least one criteria.

* * * * *